(12) United States Patent
Ranjan

(10) Patent No.: US 10,289,656 B2
(45) Date of Patent: May 14, 2019

(54) EFFICIENTLY RELOCATING OBJECTS WITHIN A DIGITAL DOCUMENT TO AN EQUIDISTANT POSITION RELATIVE TO REFERENCE OBJECTS

(71) Applicant: Adobe Inc., San Jose, CA (US)

(72) Inventor: Ashish Ranjan, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/630,789

(22) Filed: Jun. 22, 2017

(65) Prior Publication Data

US 2018/0373679 A1 Dec. 27, 2018

(51) Int. Cl.
*G06F 17/21* (2006.01)
(52) U.S. Cl.
CPC ......... *G06F 17/211* (2013.01); *G06F 17/212* (2013.01)
(58) Field of Classification Search
CPC ............................. G06F 17/211; G06F 17/212
See application file for complete search history.

(56) References Cited

U.S. PATENT DOCUMENTS

| | | | | |
|---|---|---|---|---|
| 5,796,401 A * | 8/1998 | Winer | ..................... | G06T 11/60 345/619 |
| 2006/0253777 A1* | 11/2006 | Yalovsky | ............... | G06F 17/211 715/235 |
| 2010/0281361 A1* | 11/2010 | Marchesotti | ......... | G06K 9/4671 715/253 |
| 2013/0050264 A1* | 2/2013 | Prasad | ..................... | G06F 9/451 345/643 |
| 2013/0055055 A1* | 2/2013 | Turcotte | .................. | G06F 9/451 715/201 |
| 2013/0268854 A1* | 10/2013 | Altin | ....................... | G06T 11/60 715/708 |
| 2017/0024361 A1* | 1/2017 | Shaw | ..................... | G06F 17/212 |
| 2018/0004401 A1* | 1/2018 | Travis | ................. | G06F 3/04845 |

OTHER PUBLICATIONS

"Work with Smart Guides: Learn how to align and space objects as you draw." Jun. 18, 2014; https://helpx.adobe.com/photoshop/how-to/align-space-objects.html.

\* cited by examiner

*Primary Examiner* — Asher D Kells
(74) *Attorney, Agent, or Firm* — Keller Jolley Preece

(57) ABSTRACT

The present disclosure relates to an equidistant object relocating system that facilitates efficiently and automatically relocating objects within a digital document to an equidistant position relative to other objects. For example, in some embodiments, the equidistant object relocating system identifies a subject object and reference objects, including their positions, within a digital document. Based on the position of the subject object, the equidistant object relocating system generates one or more sets of overlapping objects from the reference objects. In addition, the equidistant object relocating system determines an equidistant position for the subject object based on overlapping objects within the one or more sets of overlapping objects. Further, in these embodiments, the equidistant object relocating system automatically snaps the subject object to the equidistant position.

20 Claims, 17 Drawing Sheets

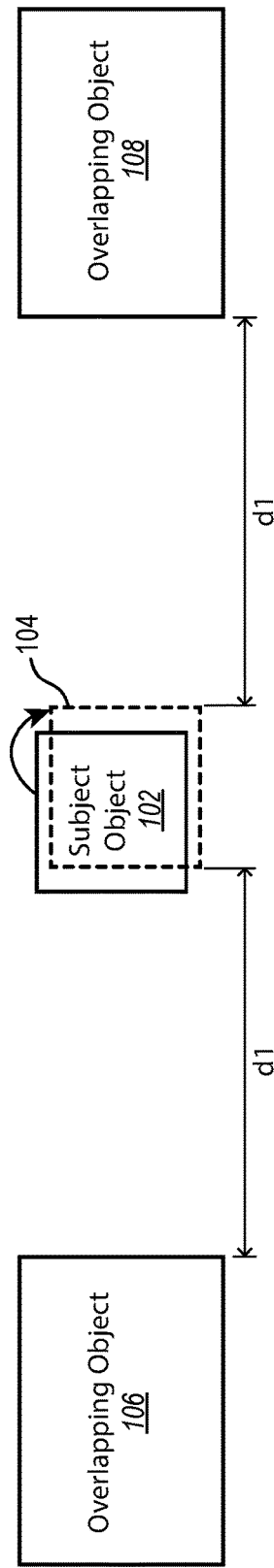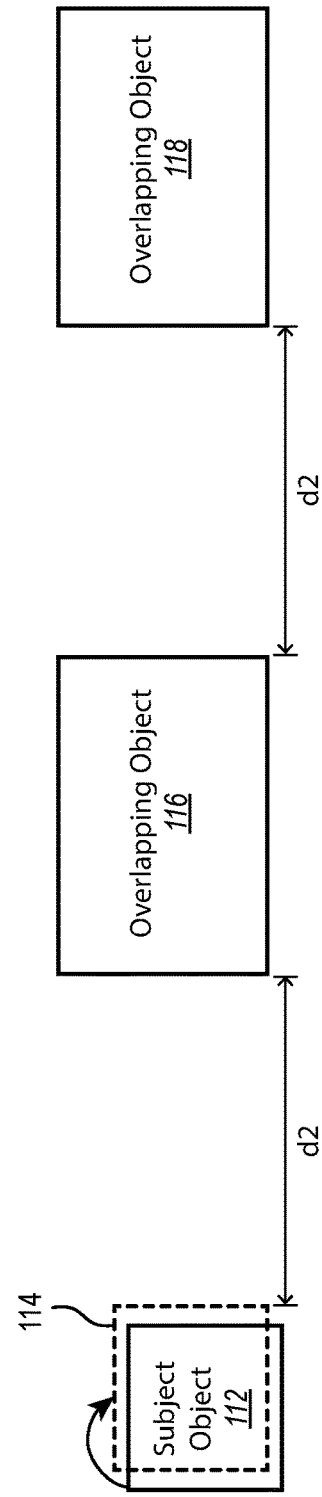

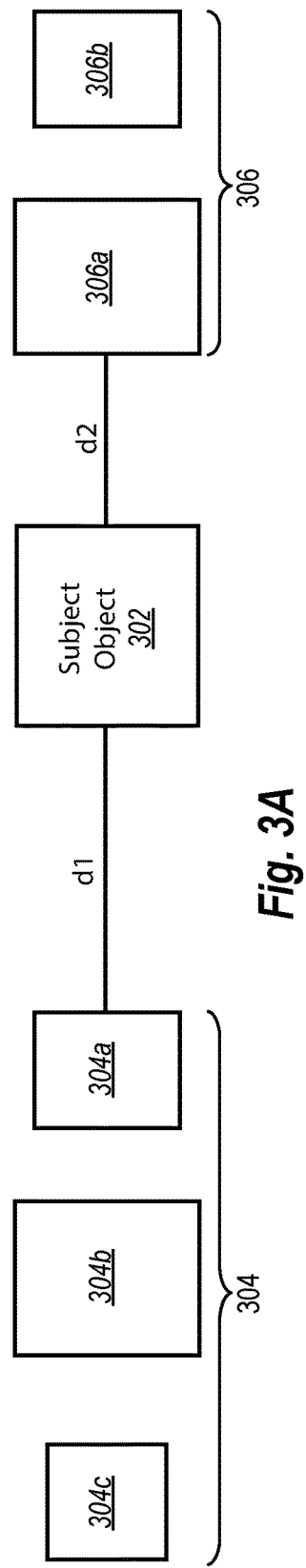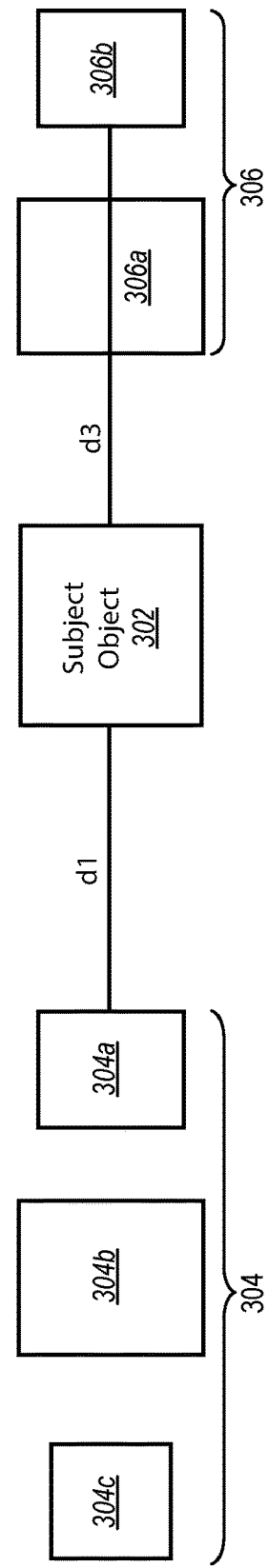

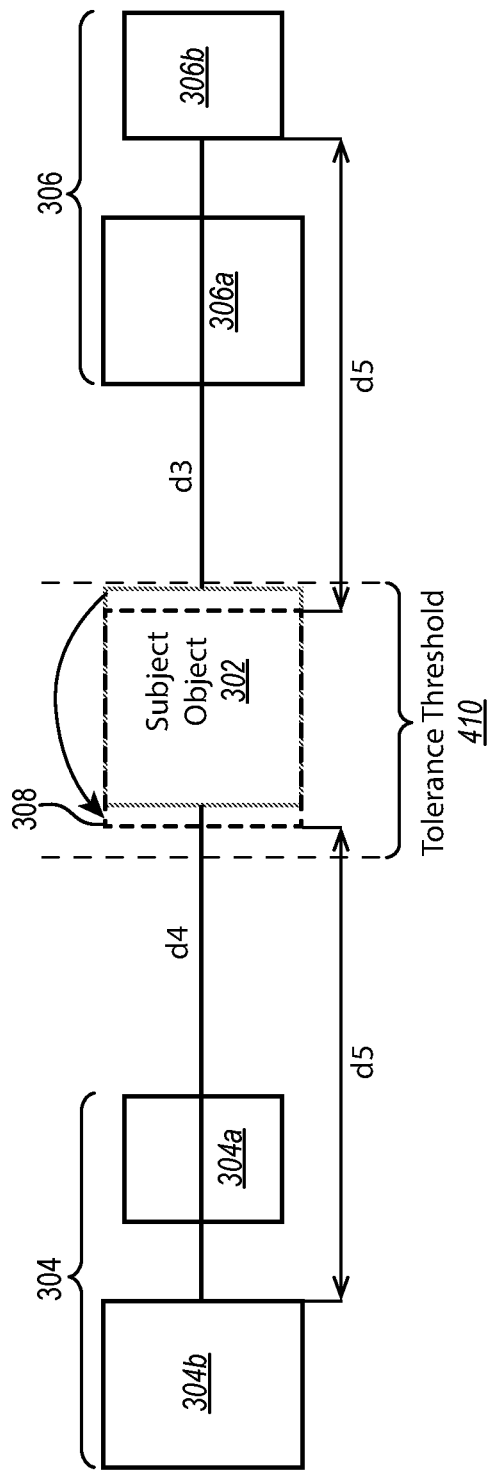

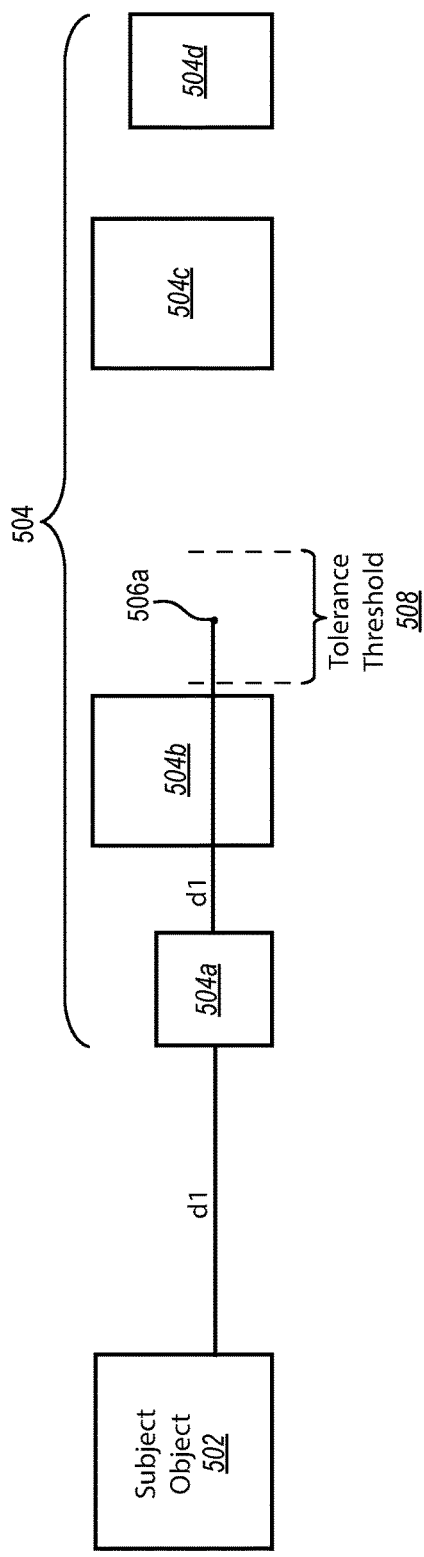
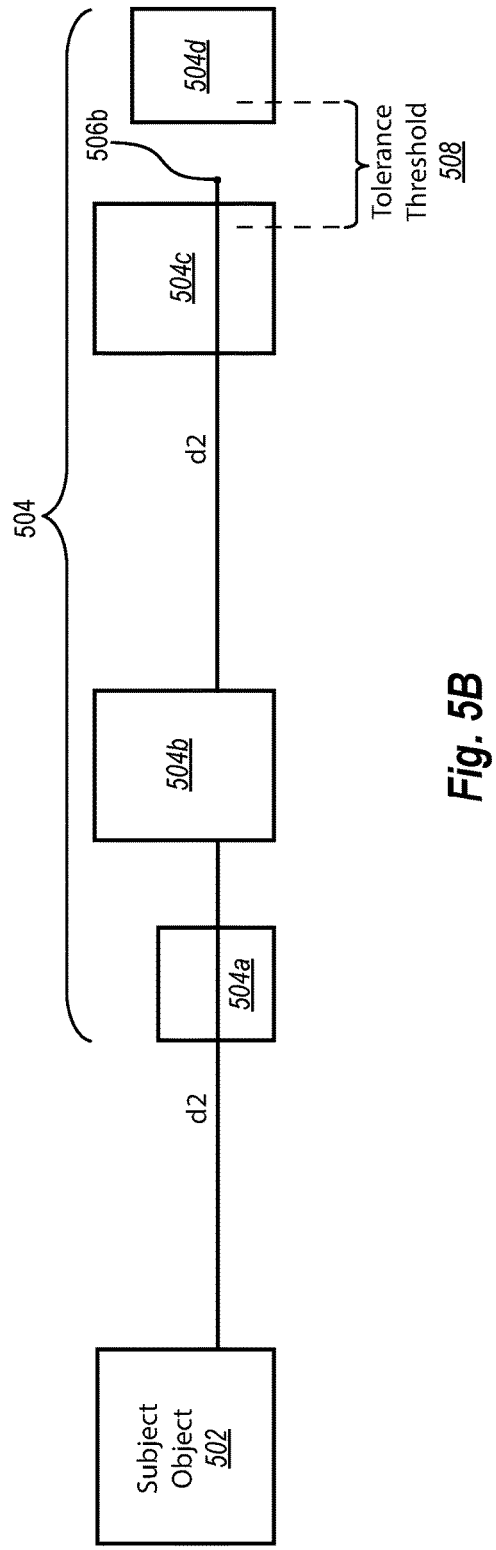

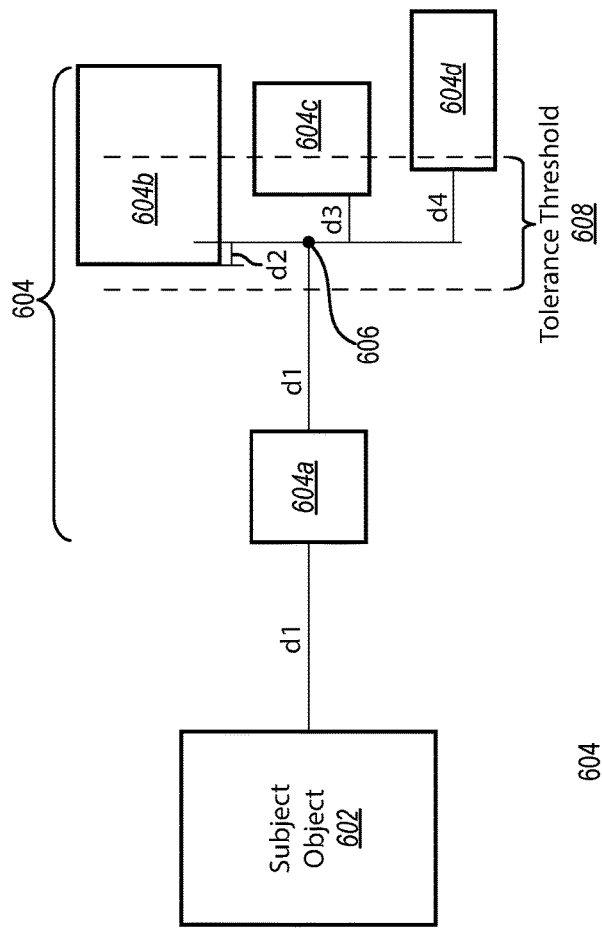
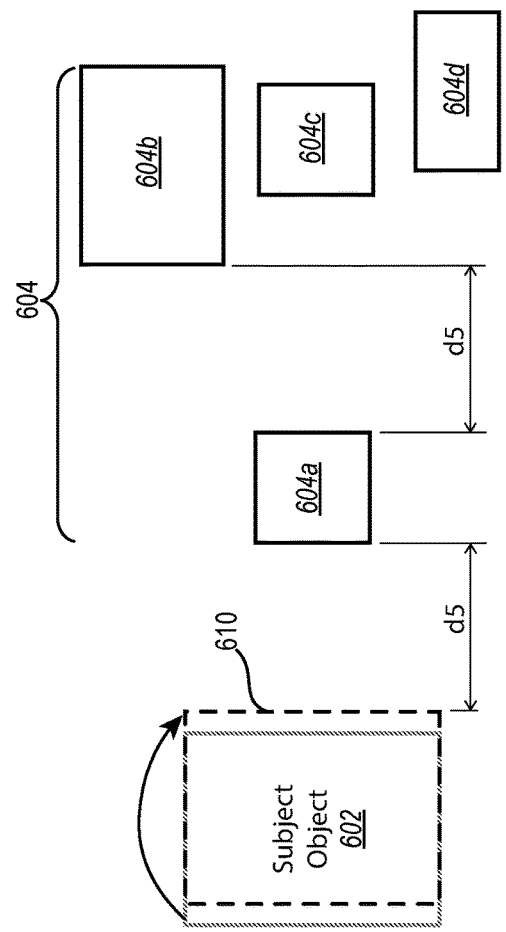

EFFICIENTLY RELOCATING OBJECTS WITHIN A DIGITAL DOCUMENT TO AN EQUIDISTANT POSITION RELATIVE TO REFERENCE OBJECTS

BACKGROUND

In recent years, developers have created a variety of drawing and design systems that assist individuals in creating, editing, and displaying digital documents. Indeed, most conventional drawing and design systems provide individuals with guides and/or constraint tools that assist with the precise placement and alignment of an object (e.g., a subject object) within a digital document. For example, some conventional design systems provide "smart guides," which help align a subject object to points of interest in the digital document. Some points include intersecting points of a digital document (e.g., the center or corner of a digital document) or points associated with other objects (e.g., a center or edge of another object).

In general, conventional design systems provide guides and constraint tools to help individuals achieve improved accuracy and precise alignment when creating, designing, and modifying objects within a digital document. Despite these and other advantages, there remains a number of problems with conventional design systems that provide guides and constraint tools.

For example, although conventional design systems can provide spacing guides that operate with a small number of objects, most conventional design systems are not scalable with digital documents that include a large number of objects. In particular, these conventional design systems suffer from severe performance issues as the number of objects in a digital document increases. For instance, as the number of objects increases, conventional design systems experience lag, jumpy movements, and delays. These problems are only exacerbated as a subject object moves within a digital document resulting in multiple sequential applications of a spacing guide. Indeed, although individuals and businesses frequently utilize digital documents with hundreds (or even thousands) of objects, in such circumstances many conventional design systems become bottlenecked and stop responding.

One notable reason for performance degradations in conventional design systems is that conventional design systems use algorithms having $O(N^2)$ complexity, where N represents the number of objects in a digital document. For example, in providing a spacing guide to a subject object in a digital document containing 1,000 objects, conventional design systems require approximately $10^6$ (i.e., $1,000^2$ or 1,000,000) computations to determine how to evenly space the subject object with other objects within the digital document. Specifically, conventional design systems determine, for each pair of objects, whether the subject object is roughly located between the object pairing, and if so, how the subject object is to be adjusted to be equally located between the object pairing.

While the number of computations exponentially grows as the number of objects in a digital document increases, the number of computations further increases as an individual moves the subject object within a digital document (e.g., using a mouse or finger to drag the subject object). On average, a subject object moved within a digital document triggers 25 movement events, each of which corresponds to a position of the subject object. Thus, continuing the above example, as an individual moves a subject object within the digital document having 1,000 objects, conventional design systems perform 25 million ($25 \times 10^6$) computations to provide a spacing guide for the subject object. Most modern computing devices cannot perform such massive numbers of computation in real-time without experiencing significant lag and bottlenecking.

These along with additional problems and issues exist with regard to conventional drawing and design systems and methods.

SUMMARY

One or more embodiments of the present disclosure provide benefits and/or solve one or more of the foregoing (or other problems) in the art, with systems and methods that improve automatic equidistant positioning of objects within a digital document. In particular, various embodiments disclosed herein provide systems and methods that significantly reduce the number of computations needed to provide automatic equidistant positioning for a subject object in a digital document, even where the digital document includes a large number of objects. For instance, the disclosed systems and methods can automatically and efficiently relocate (e.g., snap) a subject object to an equidistant position between two reference objects in a digital document or snap the subject object to an equidistant position at the end of a sequence of evenly spaced reference objects. Even for a digital document having thousands of objects, the systems and methods disclosed herein can provide automatic equidistant positioning for a subject object to a user in real-time as the user moves the subject object within the digital document.

The disclosed systems and methods can reduce the computational complexity of moving a subject object to an equidistant position utilizing a variety of approaches. For example, in one or more embodiments, the disclosed systems and methods generate a set of overlapping objects that align with the subject object along a plane. The disclosed systems and methods can efficiently traverse the set of overlapping objects based on distance from the subject object to determine an equidistant position that satisfies a threshold tolerance. By generating, utilizing, and traversing the set of overlapping objects based on distance from the subject object, the disclosed systems and methods can significantly reduce computational complexity and improve performance in relocating a subject object to an equidistant position relative to reference objects.

To briefly demonstrate, in one or more embodiments, the disclosed systems and methods identify objects in a digital document. For example, the disclosed systems and methods can identify a subject object and reference objects, including their positions. Based on the position of the subject object relative to the reference objects, the disclosed systems and methods can generate one or more sets of overlapping objects from the reference objects that are used to determine an equidistant position for the subject object. For instance, the disclosed systems and methods can generate a first set of overlapping objects that includes reference objects within a first region projected from one side of the subject object and a second set of overlapping objects that includes reference objects within a second region projected from the opposite side of the subject object. Based on the sets of overlapping objects, the disclosed systems and methods can compare the overlapping objects between each set, from closest to farthest from the subject object, to identify an equidistant position match. Once the equidistant position match is found, the disclosed systems and methods move (e.g., snap) the subject object to the equidistant position.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIGS. 1A and 1B illustrate examples of moving a subject object to an equidistant position based on overlapping objects in accordance with one or more embodiments.

FIGS. 3A-3D illustrate moving a subject object to an equidistant position based on surrounding overlapping objects in accordance with one or more embodiments.

FIG. 4 illustrates utilizing a threshold tolerance to move a subject object to an equidistant position based on surrounding overlapping objects in accordance with one or more embodiments.

FIGS. 5A-5C illustrate moving a subject object to an equidistant position based on overlapping objects located on the same side of the subject object in accordance with one or more embodiments.

FIGS. 6A and 6B illustrate determining an equidistant position for a subject object based on a closest matching overlapping object in accordance with one or more embodiments.

DETAILED DESCRIPTION

Figure 2:
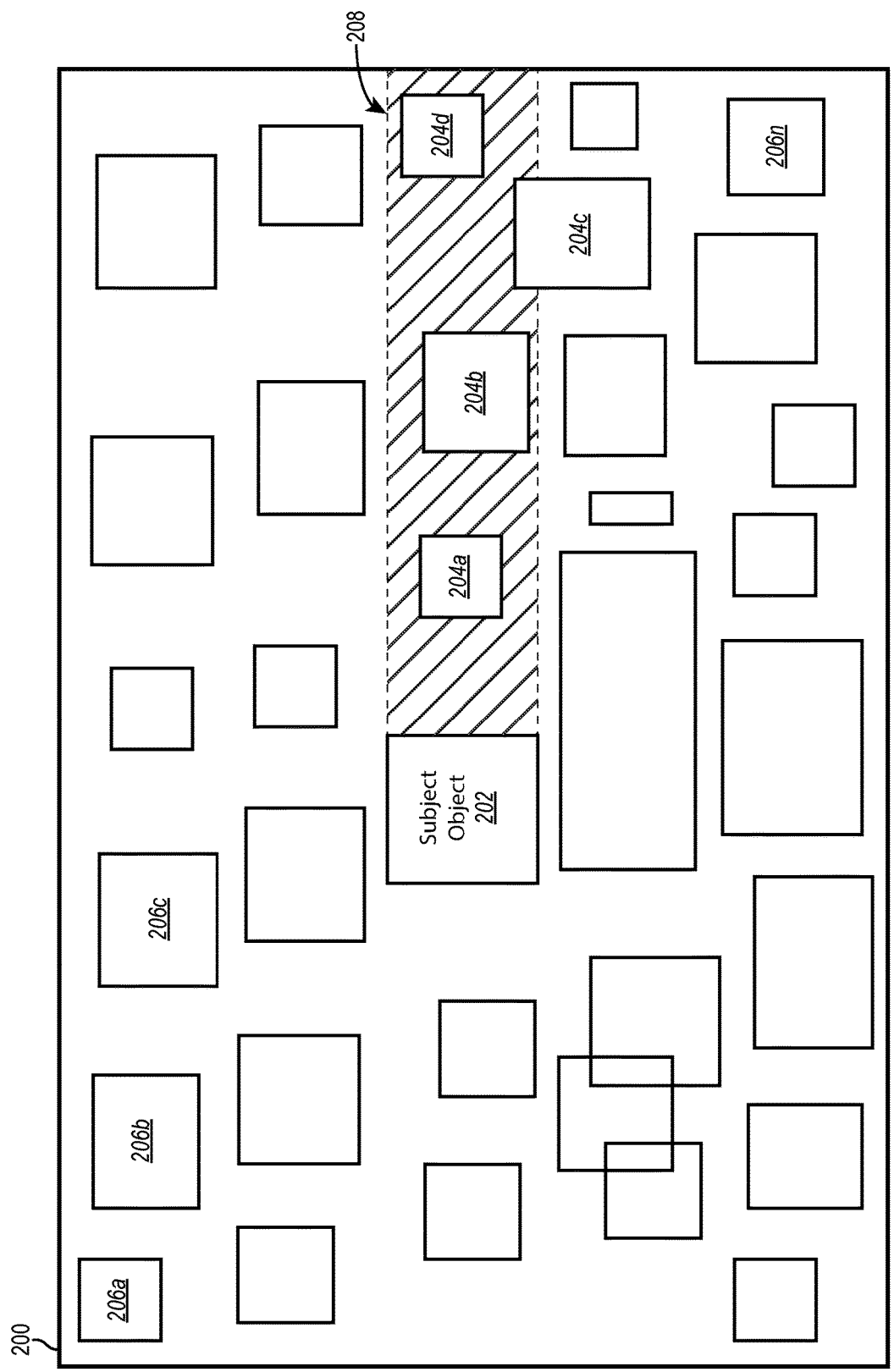
FIG. 2 illustrates generating a set of overlapping objects within a digital document in accordance with one or more embodiments.

This disclosure describes one or more embodiments of an equidistant object relocating system that efficiently and automatically relocates objects (i.e., "subject objects") within a digital document to an equidistant position relative to other objects (i.e. "reference objects"). As described below, embodiments of the equidistant object relocating system significantly reduce the number of computations needed to provide automatic equidistant positioning for a subject object. As a result, the equidistant object relocating system can snap a subject object to equidistant positions relative to other reference objects in real-time as the user moves the subject object within a digital document, even if the digital document includes thousands of objects.

The equidistant object relocating system can employ multiple techniques to achieve improved performance over conventional design systems. As one example, the equidistant object relocating system can determine an equidistant position for a subject object by identifying and analyzing only a subset of reference objects in a digital document. For instance, the equidistant object relocating system can determine a subset of reference objects that are aligned with the subject object along a plane (i.e., "overlapping objects"). The equidistant object relocating system can then analyze the overlapping objects (rather than all reference objects in the digital document) to identify an equidistant position and move the subject object to the equidistant position.

Moreover, in some embodiments, the equidistant object relocating system determines an equidistant position for the subject object by traversing through the overlapping objects based on distance relative to the subject object. For example, the equidistant object relocating system can analyze overlapping objects in order of proximity from the subject object until identifying a pair of overlapping objects that satisfy parameters (i.e., a "threshold tolerance") for snapping the subject object to an equidistant position. By traversing through the overlapping objects in a particular order based on distance relative to the subject object, the equidistant object relocating system can determine an equidistant position without analyzing all of the reference objects in the digital document (or even analyzing all of the overlapping objects in the digital document).

Furthermore, in one or more embodiments, the equidistant object relocating system improves computational efficiency by generating, utilizing, and updating object caches that identify the position of each object in a particular order. For example, the equidistant object relocating system can generate object caches that include position information for reference objects in a digital document and arrange the reference objects from left-to-right and from right-to-left. The equidistant object relocating system can then utilize the object caches to efficiently generate overlapping object arrays as a user moves a subject object. Moreover, the equidistant object relocating system can further reduce the number of computations by updating the object caches only when reference objects move within a digital document. By generating object caches in particular orders, utilizing the object caches to generate overlapping object sets, and updating the object caches only when reference objects are moved, the equidistant object relocating system can significantly reduce the number computations required to dynamically relocate subject objects to equidistant positions within a digital document.

The equidistant object relocating system can provide automatic equidistant positioning for any arrangement of reference objects. For example, the equidistant object relocating system can snap a subject object to an equidistant position between two reference objects (such that the subject object is in the middle of two reference objects). Moreover, the equidistant object relocating system can also snap a subject object to an equidistant position that is at the end of a sequence of reference objects (such that the subject object is at the front or back end of a sequence of equally-spaced objects).

For example, in moving a subject object between reference objects, the equidistant object relocating system can analyze overlapping objects in two directions to determine an equidistant position. To illustrate, in one or more embodiments, as a user moves a subject object within a digital document, the equidistant object relocating system identifies the position of the subject object relative to the position of reference objects in the digital document. Based on the position of the subject object, the equidistant object relocating system can generate a first set of overlapping objects that include reference objects within a region projected from one side of the subject object. Similarly, the equidistant object relocating system can generate a second set of overlapping objects that include reference objects within a region projected from the opposite side of the subject object. In addition, the equidistant object relocating system can arrange the overlapping object sets based on distance to the subject object.

The equidistant object relocating system can then traverse through the two sets of overlapping objects (based on position relative to the subject object) to identify two overlapping objects that satisfy a threshold tolerance. For example, the equidistant object relocating system can identify a closest overlapping object in the first set of overlapping objects and compare it to the closest overlapping object in the second set of overlapping objects. If the two closest overlapping objects satisfy a threshold tolerance, the equidistant object relocating system can identify an equidistant position between the two identified overlapping objects and snap the subject object to the equidistant position. If the two closest overlapping objects do not satisfy the threshold tolerance, the equidistant object relocating system can continue traversing through the sets of overlapping objects, from nearest to farthest (or vice-versa) from the subject object, to identify a pair of overlapping objects (e.g., one overlapping object from each set) that satisfy the threshold tolerance.

As mentioned above, the equidistant object relocating system can also relocate a subject object to an equidistant position at the end of a sequence of reference objects. For example, the equidistant object relocating system can search overlapping objects in a first direction from the subject object to identify objects that satisfy a threshold tolerance in the first direction.

To illustrate, the equidistant object relocating system can generate a set of overlapping objects in a first direction from the subject object. Using the generated set of overlapping objects, the equidistant object relocating system can determine a closest overlapping object in the set of overlapping objects and a distance between the subject object and the closest overlapping object. The equidistant object relocating system can then search a subset of the overlapping objects based on this distance and a threshold tolerance. If the equidistant object relocating system identifies a matching object (i.e., an object that satisfies the threshold tolerance), the equidistant object relocating system can determine an equidistant position and snap the subject object to the equidistant position. Otherwise, the equidistant object relocating system can traverse the set of overlapping objects based on position from the subject object until it identifies two overlapping object that satisfy the threshold tolerance.

As previously mentioned, the equidistant object relocating system provides many advantages and benefits over conventional design systems. For example, the equidistant object relocating system improves computer functionality by drastically reducing processing requirements to a computing device when determining equidistant positions for subject objects within digital documents. For example, as described above, conventional systems generally require $O(N^2)$ computations to provide a spacing guide, such as snapping an object to an equidistant position. In contrast, in the worst-case complexity, the equidistant object relocating system can generate object caches by performing $O(N \log N)$ computations and then dynamically identify equidistant positions by performing $O(K \log K)$ computations (where K represents the number of overlapping objects, K is typically less than N/20, and N represents the number of objects in a digital document). In some circumstances, as outlined below, the equidistant object relocating system performs $O(K)$ computations.

Performing $O(N \log N)$ and $O(K \log K)$ computations is significantly less burdensome than analyzing at $O(N^2)$ complexity. To provide context, in the above-described example that included 1,000 objects in a digital document, a conventional design system performs approximately 25,000,000 computations (at $O(N^2)$) to provide an equidistant position for a subject object as it moves within a digital document (e.g., using 25 movement events). Under the same conditions, the equidistant object relocating system can reduce the number of computations to less than 12,000 computations.

As another benefit, the equidistant object relocating system enables a user to seamlessly move subject objects in complex designs having a large number of objects while providing one or more equidistant position guides in real-time. As mentioned above, conventional design systems freeze or experience significant lag as the number of objects in a digital document increase. As such, users of conventional design systems are delayed and deterred from using spacing guides. In contrast, the equidistant object relocating system disclosed herein seamlessly relocates subject objects to equidistant positions in real-time with little or no lag or delay.

Referring now to the figures, FIGS. 1A and 1B illustrate examples of the equidistant object relocating system automatically relocating a subject object to an equidistant position based on overlapping objects in accordance with one or more embodiments. In particular, FIG. 1A shows the equidistant object relocating system moving a subject object 102 to an equidistant position 104 that is between a first overlapping object 106 and a second overlapping object 108. Moreover, FIG. 1B shows the equidistant object relocating system moving a subject object 112 to an equidistant position 114 that is at the front end of an evenly spaced sequence with a first overlapping object 116 and a second overlapping object 118.

For reference, as used herein, the term "digital document" refers to a logical unit of electronic data. In particular, a "digital document" includes a logical unit of electronic data, such as an electronic file that, is user-generated and/or user-editable and includes one or more objects. Digital documents are often stored as one or more computer files and can be shared among users, either electronically or digitally. Examples of digital documents include, but are not limited to, a digital canvas or artboard, a computer text document, a word processing file, an image, a video, a spreadsheet, a collection of digital slides or pages within a digital presentation file, or a webpage. For example, FIGS. 1A, 1B illustrates objects within a canvas for creating digital illustrations.

The terms "digital object," "art object," or "object," as used herein generally refer to items within a digital document. In particular, the terms "digital object," "art object," or "object," include items within a digital document that a user can create, move, manipulate, modify, transform, and/or remove. For instance, objects include graphics, text blocks, and shapes. Similarly, examples of objects include, but are not limited to, vector objects, rasterized objects, text objects, and three-dimensional objects. Objects can have properties and characteristics, such as position, size, bounds, rotation, shearing, color, transparency, type, etc. For example, FIGS. 1A and 1B illustrate objects 102, 106, 108, 112, 116, 118 as shapes within a digital document.

Further, as used herein, the term "subject object" refers to an object within a digital document actively selected by a user. For example, a "subject object" includes an object within a digital document that a user selects to move, drag, shift, resize, transform, or otherwise modify. For instance, the equidistant object relocating system can detect user input selecting at least one object within a digital document, and identify the selected object as a subject object. Moreover, the term "subject object" also includes an object that the equidistant object relocating system relocates to an equidistant position in relation to other reference objects. To illustrate, the equidistant object relocating system can detect user interaction with a subject object at a first position and snap the subject object from the first position to an equidistant position relative to two reference objects. For example, FIGS. 1A and 1B illustrate the subject objects 102, 112 that a user selects and the equidistant object relocating system snaps to equidistant positions 104, 114.

As used herein, the term "reference object" refers to non-selected objects in a digital document or objects in a digital document that are not selected as the subject object. For example, the equidistant object relocating system can receive selection of a subject object and identify the other remaining objects in the digital documents as reference objects for snapping the subject object to an equidistant position. Similarly, the term "overlapping object" refers to a reference object that overlaps a projection of the subject object. In particular, the term "overlapping object" includes a reference object that overlaps a region projected from the subject object in a given direction. To illustrate, a reference object overlaps a subject object where the reference object includes a point that shares a linear plane with a point on the subject object, where the linear plane is parallel to the given direction. Thus, an overlapping object includes a reference object that has a point that is (depending on the direction of the projection) directly right, left, above, or below a subject object. For example, FIGS. 1A and 1B illustrate reference objects 106, 108, 116, 118 that are also overlapping objects. In particular, the overlapping objects 106, 108, 116, 118 fall within regions of the digital document projected from horizontal directions of the subject objects 102, 112.

As used herein, the term "equidistant position" refers to a location of a subject object within a digital document that would result in three objects within the digital document being evenly spaced. In particular, the term "equidistant position" refers to a new location of a subject object that results in the subject object and at least two reference being evenly spaced. For example, in relation to FIG. 1A, the equidistant position 104 is a mid-point location between two overlapping objects 106, 108. In relation to FIB. 1B, the equidistant position 116 is a location to one side of two overlapping objects 116, 118, such that the subject object 112 and the two corresponding overlapping objects 116, 118 are spaced evenly apart. Generally, an equidistant position causes the gap between the subject object and the corresponding overlapping objects to be equal. As described below, however, depending on the origin of measurement (e.g., center-to-center, first edge-to-second edge, etc.), the equidistant position can vary from embodiment to embodiment.

As mentioned above, FIG. 1A shows the equidistant object relocating system assisting a user in automatically relocating a subject object 102 to an equidistant position 104 between two overlapping objects in a digital document. For example, using an input device such as a mouse cursor or a finger, a user drags the subject object 102 within a digital document. As the subject object 102 moves within the digital document, the equidistant object relocating system detects the position of the subject object 102. For instance, in some embodiments, the equidistant object relocating system detects the subject object's position every few hundred milliseconds (e.g., at each movement event) as a user is dragging the subject object 102 within the digital document.

In relation to FIG. 1A, for each detected position, the equidistant object relocating system determines the equidistant position 104 for the subject object 102. Moreover, the equidistant object relocating system uses the position of the subject object 102 to generate sets of overlapping objects based on reference objects that overlap the subject object 102. As shown in FIG. 1A, the equidistant object relocating system detects that the first overlapping object 106 is a reference object that overlaps to the left of the subject object 102, and that the second overlapping object 108 is a reference object that overlaps to the right of the subject object 102.

Based on the location (i.e., position) of the objects in FIG. 1A, the equidistant object relocating system adds the first overlapping object 106 to a first set of overlapping objects and the second overlapping object 108 to a second set of overlapping objects. While not shown, the equidistant object relocating system can add additional overlapping objects to each set of overlapping objects. Additional detail regarding the equidistant object relocating system detecting overlapping reference objects and generating overlapping object sets is provided below in connection with FIG. 2.

The equidistant object relocating system can use the sets of overlapping objects to determine the equidistant position 104. For example, the equidistant object relocating system can use the position of the subject object 102 in relation to the first overlapping object 106 and the second overlapping object 108 to determine the equidistant position 104. In particular, in one or more embodiments, the equidistant object relocating system compares the distances between the subject object 102 and the first overlapping object 106 to the distance between the subject object 102 and the second overlapping object 108.

If the two distances are within a threshold tolerance of each other (e.g., a threshold distance of 1-5 pixels), the equidistant object relocating system determines that the subject object 102 is positioned roughly in the middle of the two overlapping objects. Further, the equidistant object relocating system determines that the two overlapping objects are suitable for relocating (e.g., snapping) the subject object 102 to an equidistant position between the first overlapping object 106 and the second overlapping object 108.

If the two distances are not within a threshold tolerance, the equidistant object relocating system determines that the current position of the subject object 102 is too far from the middle of the two overlapping objects, and, thus, the equidistant object relocating system does not utilize the overlapping object 106 and the overlapping object 108 to snap the subject object 102 to an equidistant position between the overlapping object 106 and the overlapping object 108. Additional detail regarding the equidistant object relocating system determining the equidistant position and identifying different overlapping objects is provided below with respect to FIGS. 3A-3D.

Once the equidistant position 104 is determined, the equidistant object relocating system can move the subject object 102 to the equidistant position 104. As shown, the equidistant object relocating system automatically relocates the subject object 102 from the previous position to the equidistant position 104 such that the subject object 102 is the same distance (e.g., "d1") from the first overlapping object 106 as it is from the second overlapping object 108.

In some embodiments, the equidistant object relocating system moves the subject object 102 while the user is dragging a subject object within the digital document. Specifically, as the user adjusts the subject object 102 to different positions, the equidistant object relocating system dynamically determines an equidistant position based on the subject object's current position and automatically moves the subject object 102 to the equidistant position.

As mentioned above, FIG. 1B shows the equidistant object relocating system moving a subject object 112 from its current position to an equidistant position 114 that is evenly spaced (i.e., by distance "d1") with a first overlapping object 116 and a second overlapping object 118. Specifically, the equidistant object relocating system determines that the current position of the subject object 112 is roughly located between two other reference objects 116, 118 and, in response relocates the subject object to the equidistant position 114.

As shown, the subject object 112 is located on one side of at least two reference objects 116, 118. As described above, the equidistant object relocating system can determine that the two reference objects are overlapping objects. Specifically, the equidistant object relocating system can determine that the reference objects overlap a region projected horizontally from the subject object 112. In response, the equidistant object relocating system can add the overlapping objects 116, 118 to a set of overlapping objects. Additional detail regarding how the equidistant object relocating system identifies overlapping objects and generates overlapping object sets is provided in connection with FIG. 2 below.

As mentioned above, the equidistant object relocating system can use a set of overlapping objects that includes the first overlapping object 116 and the second overlapping object 118 to determine the equidistant position 114 for the subject object 112. For example, as shown, the equidistant object relocating system determines whether the distance between the subject object 112 and the first overlapping object 116 is similar in length (e.g., within a threshold tolerance) to the distance between the first overlapping object 116 and the second overlapping object 118. If so, the equidistant object relocating system uses the first overlapping object 116 and the second overlapping object 118 to determine the equidistant position 114. If the first overlapping object 116 and the second overlapping object 118 do not satisfy the threshold tolerance, the equidistant object relocating system determines whether other pairs of overlapping objects in the overlapping object set can satisfy the threshold tolerance, given the current position of the subject object 112.

As shown in FIG. 1B, upon determining that the first overlapping object 116 and the second overlapping object 118 do satisfy the threshold tolerance, the equidistant object relocating system moves (or snaps) the subject object 112 to the equidistant position 114. As used herein, the terms "snap" or "snapping" refer to relocating, shifting, or aligning an object (or a part of an object) to a particular position, location, or point within the digital document. In some embodiments, the equidistant object relocating system snaps a subject object to an equidistant position when the subject object is within a snapping tolerance (i.e. threshold tolerance) of the equidistant position.

Thus, as illustrated in FIGS. 1A and 1B, the equidistant object relocating system automatically identifies equidistant positions in relation to reference objects and dynamically snaps subject objects to the equidistant positions. As mentioned above, the equidistant object relocating system can identify these equidistant positions and relocate subject objects efficiently by identifying a set of overlapping objects within a digital document. For example, FIG. 2 shows the equidistant object relocating system generating a set of overlapping objects within a digital document in accordance with one or more embodiments. Specifically, FIG. 2 illustrates a digital document 200 that includes a subject object 202 and reference objects 206a-n. For simplicity, the reference objects 206a-n are not individually labeled.

As mentioned above, based on detecting a user moving a subject object to various positions within a digital document, the equidistant object relocating system can automatically determine and relocate the subject object to an equidistant position corresponding to each of the various positions. As part of determining an equidistant position for a subject object, in one or more embodiments, the equidistant object relocating system first identifies overlapping objects corresponding to the current position of the subject object. Accordingly, the subject object 202 in FIG. 2 can represent the subject object 202 at a resting position or at an intermediary position (e.g., the subject object is currently moving) within the digital document 200.

As also mentioned above, a reference object can overlap a subject object when the reference object is located on one side of the subject object. As shown in FIG. 2, the equidistant object relocating system identifies reference objects to the right of the subject object 202 as overlapping objects 204a-d. The equidistant object relocating system employs a projected region 208 to identify which of the reference objects 206a-n are overlapping objects based on the current position of the subject object 202.

As shown, the projected region 208 extends to the right of the subject object 202 from the right top corner to the bottom right corner of the subject object 202 in a horizontal direction. FIG. 2 shows that the projected region 208 fully overlaps three reference objects (e.g., the first overlapping object 204a, the second overlapping object 204b, and the fourth overlapping object 204d) and partially overlaps one reference object (e.g., the third overlapping object 204c). In one or more embodiments, only reference objects fully overlapped by the projected region 208 are designated as an overlapping object. In other embodiments, the equidistant object relocating system identifies an overlapping object as any reference object that partially overlaps with the projected region 208. In some embodiments, the equidistant object relocating system first identifies reference objects 206 that are fully overlapped, and if needed, expands the overlapping objects to include partially overlapped reference objects.

The equidistant object relocating system can translate the visual projected region 208 shown in FIG. 2 into a coordinate system. For example, if the digital document 200 is arranged in an X, Y grid, the equidistant object relocating system uses the (x, y) coordinates of the top right corner and the bottom right corner as well as corresponding coordinates on the right edge of the digital document 200 to define the projected region 208. Further, the equidistant object relocating system can identify any of the reference objects 206 that have coordinates located with the projected region 208.

Moreover, although FIG. 2 is illustrated in a two-dimensional space, the equidistant object relocating system can also identify overlapping objects in a three-dimensional space. For example, the equidistant object relocating system can similarly generate the projected region 208 in a horizontal (or other) direction in a three-dimensional space and identify the reference objects that overlap the projected region 208.

In one or more embodiments, the equidistant object relocating system groups overlapping objects into an overlapping object set. For example, as shown, the equidistant object relocating system groups the overlapping objects 204a-d to the right of the subject object 202 into a first set of overlapping objects. Additionally, or alternatively, the equidistant object relocating system groups reference objects positioned to the left of the subject object 202 and that overlap with the subject object 202 into a second set of overlapping objects. Similarly, the equidistant object relocating system can identify additional sets of overlapping objects that include reference objects that overlap the top edge (in a vertical direction) and/or the bottom edge (in a vertical direction) of the subject object 202.

Additionally, in some embodiments, the equidistant object relocating system shrinks/expands the scope of the projected region 208 to decrease/increase the number of reference objects included in a set of overlapping objects. For example, the equidistant object relocating system can restrict the number of overlapping objects in a set of overlapping objects based on a maximum threshold (e.g., 10, 20, or 50 overlapping objects; or 40% of the reference objects). Likewise, the equidistant object relocating system can limit the distance (e.g., length) that the projected region 208 projects from the subject object 202. In contrast, the equidistant object relocating system can expand the height or width of the projected region 208 to identify additional overlapping objects, such as when the equidistant object relocating system cannot identify an equidistant position based on the overlapping object currently in the set of overlapping objects.

The equidistant object relocating system can store an overlapping object set as an overlapping object array. In one or more embodiments, as the equidistant object relocating system identifies the overlapping objects 204a-d, the equidistant object relocating system pushes each object onto an overlapping object array. Further, in some embodiments, the equidistant object relocating system arranges the overlapping object array based on relative distance to the subject object 202 (e.g., closest-to-farthest or farthest-to-closest). Alternatively, the equidistant object relocating system arranges the array using another scheme, such as top-to-bottom, bottom-to-top, or by size of each object.

To aid in identifying overlapping objects and/or creating overlapping object sets, the equidistant object relocating system can create one or more object caches of the digital document 200. For example, in one or more embodiments, the equidistant object relocating system creates an object cache that indicates the position of each object in the digital document 200. In addition to including each object's position, the object cache can include the size, bounds, edges, corner coordinates, and other properties of each object.

Further, the equidistant object relocating system can create one or more sorted object caches. For instance, the equidistant object relocating system arranges a left object cache from left-to-right based on each object's position (e.g., order the object cache based on the left-most edge, top-left corner, center, or right edge of each object). In addition to creating the left object cache, in one or more embodiments, the equidistant object relocating system creates a right object cache that arranges the objects in the digital document 200 from right-to-left (e.g., based on the left-most edge, top-left corner, center, or right edge of each object). In this manner, the equidistant object relocating system generates two bi-directional object caches. Additionally, or alternatively, the equidistant object relocating system can also create other sorted object caches, such as a sorted object cache that arranges objects from top-to-bottom and/or bottom-to-top object cache. Other examples of sorted object caches include the equidistant object relocating system sorting objects in a digital document 200 based on largest-to-smallest objects, object type, layer location, rotation amount, shearing amount, and/or color score.

Further, the equidistant object relocating system can update each of the one or more object caches based on detecting a change in an object's position. For example, upon moving an object to a new position within the digital document 200, the equidistant object relocating system updates the order of objects within one or more of the object caches to reflect the new position. Similarly, the equidistant object relocating system can update an object cache based on detecting a changed object property or characteristic (e.g., change in size, rotation, shearing, etc.).

Indeed, in one or more embodiments, the equidistant object relocating system utilizes sorted object caches and/or overlapping object arrays to more efficiently identify objects that satisfy a threshold tolerance and move a subject object to an equidistant position. In particular, by storing a position of each object in a digital document within a cache (based on relative position within the digital document), the equidistant object relocating system can utilize the cache to efficiently generate and organize overlapping objects. Moreover, in one or more embodiments, the cache only updates after objects in a digital document have moved. Accordingly, the equidistant object relocating system can generate the cache and then repeatedly utilize the cache to efficiently generate overlapping object arrays that reflect the position of reference objects relative to a subject object. Moreover, the equidistant object relocating system can then traverse the overlapping object arrays based on position relative to a subject object to efficiently identify overlapping objects that satisfy threshold tolerances.

For example, in one or more embodiments, the equidistant object relocating system employs the pseudocode shown in Listing 1 below to create an object cache as well as sorted object caches (e.g., a left object cache and a right object cache).

```
Build_Cache( )

{
  ClearAllCacheData
  Push bounds of the all the visible objects in BoundsList_Cache
  BoundsListSortedByLeft_Cache = SortBoundsList_Cache comparing
  Left value of the bound.
  BoundsListSortedByRight_Cache = SortBoundsList_Cache comparing
  Right value of the bound.
}
```

Listing 1

As shown in Listing 1, the BoundsList_Cache can include an array of bounds (e.g., the coordinates of an object's edges, corners, points, or center) of objects currently visible in the digital document 200. The BoundsListSortedByLeft_Cache represents the BoundsList_Cache sorted by the left bound (e.g., the left edge coordinate) of each object in a digital document. Similarly, the BoundsListSortedByRight_Cache represents the BoundsList_Cache sorted by the right bound (e.g., the right edge coordinate) of each object. Notably, building the above object caches has a worst-case complexity of O(N log N), because of the sorting, where N is the number of objects in a digital document.

As previously mentioned, the equidistant object relocating system can employ the left object cache and/or right object cache (as well as other object caches) to identify the overlapping object sets (e.g., overlapping object arrays) described above. For example, based on the position of the subject object 202, the equidistant object relocating system uses the left object cache to determine which other objects (e.g., which of the reference objects 206a-206n) are positioned to the right of the subject object 202 (e.g., have a left edge located on the right of the subject object 202). In particular, using the position of the subject object 202, the equidistant object relocating system identifies the first reference objects in the left object cache having an x-coordinate that is larger than the x-coordinate of the subject object (e.g., the first reference object located on the right of the subject object in the digital document). The equidistant object relocating system can then traverse through the remaining objects in the left object cache to determine which objects overlap the subject object 202 (e.g., are located within the projected region 208) to create a right overlapping object set.

Listing 2 below provides pseudocode that the equidistant object relocating system employs in some embodiments to create a right set of overlapping objects (e.g., overlapping objects to the right of the subject object such as those shown in FIG. 2) and a left set of overlapping objects (e.g., overlapping objects to the left of the subject object).

---

Build_Left_Right_Sorted_Array(Bound Subject)

---

```
{
  UpperIndex =
  BinarySearch_UpperBound(BoundsListSortedByLeft_Cache,
  Subject.Left)
  while(UpperIndex >= 0)
  {
    if(BoundsListSortedByLeft_Cache[UpperIndex] is positioned as a
    left overlapping object to the subject object)
      Push BoundsListSortedByLeft_Cache[UpperIndex] to
      OverlappingLeftBoundsList
    --UpperIndex
  }
  LowerIndex =
  BinarySearch_UpperBound(BoundsListSortedByRight_Cache,
  Subject.Right)
  while(LowerIndex < BoundsListSortedByLeft_Cache.Size)
  {
    if(BoundsListSortedByRight_Cache[LowerIndex] is positioned as
    a right overlapping object to the subject object)
      Push BoundsListSortedByRight_Cache[LowerIndex] to
      OverlappingRightBoundsList
    ++LowerIndex
  }
}
```

Listing 2

As shown in Listing 2, Build_Left_Right_Sorted_Array creates two sorted sets (e.g., the left overlapping object array and the right overlapping object array) of overlapping objects for a subject object. In particular, the Build_Left_Right_Sorted_Array utilizes the sorted object caches and the position of the subject object to push overlapping objects positioned to the right of the subject object into the right overlapping object array and overlapping objects positioned to the left of the subject object into the left overlapping object array. The equidistant object relocating system can utilize a similar approach to build a top and/or bottom overlapping object array (e.g., by applying the same approach along the y-axis of the digital document 200).

Notably, the Build_Left_Right_Sorted_Array has a worst-case time complexity of O(N), where N is the number of objects in the digital document 200. However, because Build_Left_Right_Sorted_Array employs BoundsListSortedByLeft_Cache and BoundsListSortedByRight_Cache, complexity time can be greatly reduced as each object in the digital document is previously sorted based on its position.

Figure 7:
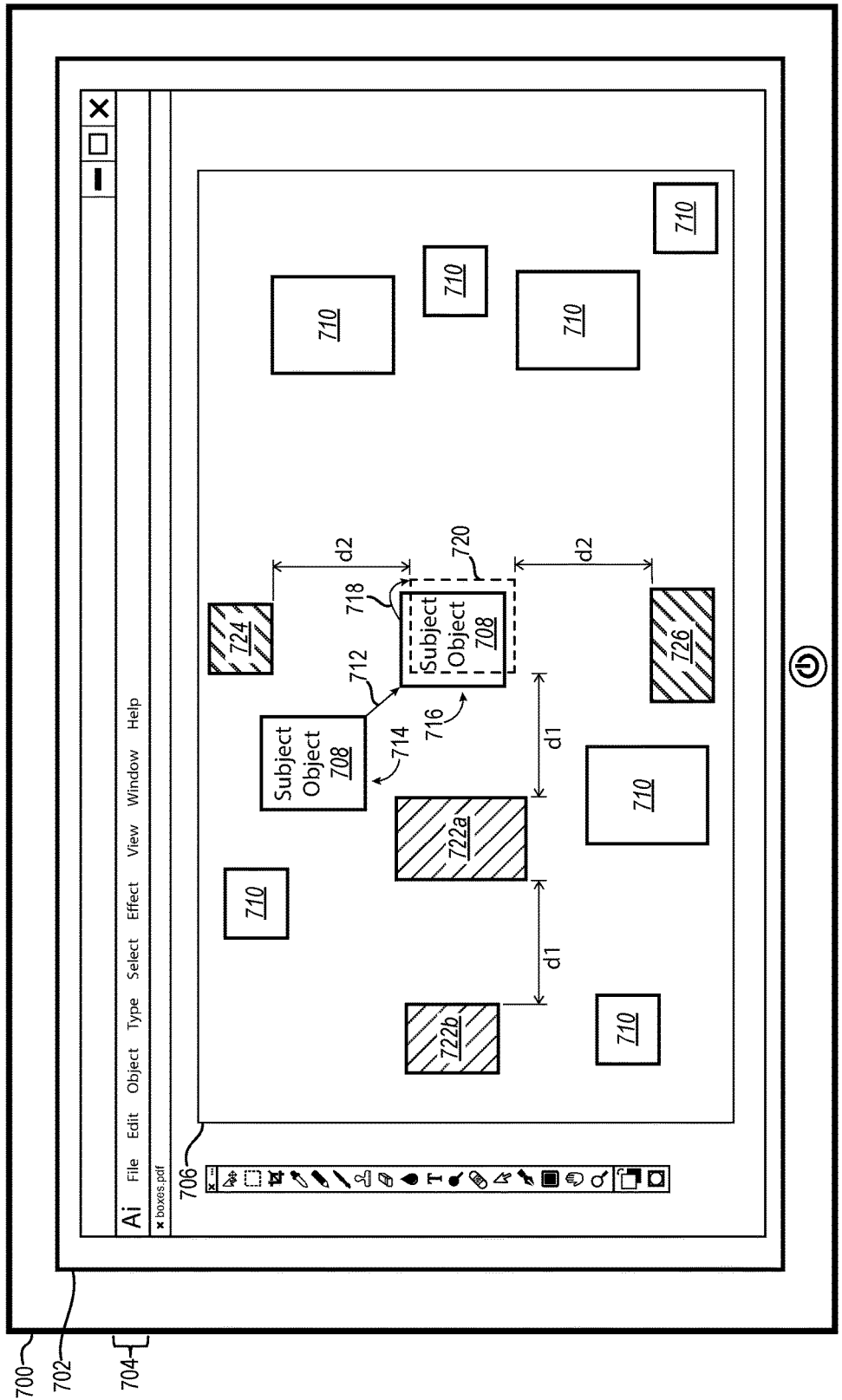
FIG. 7 illustrates a computing device with an example user interface for providing multiple equidistant position guides to a subject object within a digital document in accordance with one or more embodiments.

Using one or more sets of overlapping objects, the equidistant object relocating system can determine an equidistant position for a subject object located between overlapping objects. As an overview, FIGS. 3A-4 show the equidistant object relocating system moving a subject object to an equidistant position that is between surrounding overlapping objects. FIGS. 5A-6B show the equidistant object relocating system moving a subject object to an equidistant position that is evenly spaced with overlapping objects positioned to one side of the subject object. FIG. 7 shows an example of the equidistant object relocating system concurrently identifying equidistant positions between reference objects and equidistant positions at the end of a sequence of reference objects.

As just mentioned, FIGS. 3A-3D illustrate the equidistant object relocating system providing an equidistant position in relation to a subject object 302 based on surrounding overlapping objects (e.g., left overlapping objects 304a-c and right overlapping objects 306a-b. In particular, FIGS. 3A-3D include a left set of overlapping objects 304 and a right set of overlapping objects 306 generated by the equidistant object relocating system. For example, the equidistant object relocating system employs the principles described above in connection with FIG. 2 to generate the left set of overlapping objects 304 and the right set of overlapping objects 306. Specifically, the equidistant object relocating system builds the left set of overlapping objects 304 by identifying reference objects that fall within a region projected from the subject object 302 in a left horizontal direction and builds the right set of overlapping objects 306 by identifying reference objects that fall within a region projected from the subject object 302 in a right horizontal direction. As a note, while FIGS. 3A-3D is described with respect to objects aligned in a horizontal direction (e.g., with respect to the x-axis of a digital document), the equidistant object relocating system can also apply the same principles to objects aligned in a (or some other) direction within a digital document.

In relation to FIG. 3A, the equidistant object relocating system traverses through the sets of overlapping objects 304, 306 to determine the equidistant position for the subject object 302. In particular, the equidistant object relocating system traverses the left set of overlapping objects 304 to identify the overlapping object that is positioned closest to the subject object 302 (i.e., the first left overlapping object

304a). For example, the equidistant object relocating system compares the left edge (or the center, or some other reference point) of the subject object 302 to the right edge (or the center, or some other corresponding reference point) of the left overlapping objects 304a-c in the left set of overlapping objects 304 (e.g., based on x-coordinates) to determine which overlapping object is closest. In embodiments where the left set of overlapping objects 304 is arranged based on proximity or distance to the subject object 302 (e.g., closest-to-farthest or vice-versa), the equidistant object relocating system need only identify the first (or last) overlapping object in the set.

Upon identifying the first left overlapping object 304a as the closest overlapping object in the left set of overlapping objects 304, the equidistant object relocating system determines a distance between the subject object 302 and the first left overlapping object 304a. The equidistant object relocating system measures the horizontal distance (with respect to the digital document) between the two objects. Specifically, in one or more embodiments, the equidistant object relocating system measures the distance between the x-coordinate of the subject object 302 and the x-coordinate of the first left overlapping object 304a. In this manner, the equidistant object relocating system can consistently determine distances between two objects regardless if the objects have different alignments, offsets, rotations, sizes, shapes, etc.

In addition, the equidistant object relocating system generally measures the distance between a subject object and an overlapping object with respect to particular points on each object. To illustrate, in one or more embodiments, the equidistant object relocating system measures a distance between the closest edges of the two objects (e.g., the left-most edge of the subject object 302 and the right-most edge of the first left overlapping object 304a), which is shown in FIG. 3A as the first distance d1.

The equidistant object relocating system can employ alternative methods to measure distances between two objects. As one example, the equidistant object relocating system measures the distance between the centroid (e.g., center-to-enter) of the two objects. In another example, the equidistant object relocating system measures the distance from the center of one object to the edge (e.g., close or far) of the second object. In some cases, when measuring between two edges (e.g., the two closest edges), the equidistant object relocating system first identifies a center point, a top or bottom corner point, or a user-specified point along the edge of each object from which to measure. In one or more embodiments, the equidistant object relocating system receives user input designating how to measure distances between objects (e.g., center-to-center, close edge-to-close edge, left edge-to-left edge, near edge-to-far edge).

In some embodiments, the equidistant object relocating system measures a distance between the center (e.g., center x-coordinate or centroid) of the subject object 302 to the center of the first left overlapping object 304a. In alternative embodiments, the equidistant object relocating system uses different points on the objects to measure distance (e.g., center to edge, near-edge to near-edge, far-edge to near-edge, corner-to-corner, etc.) In some embodiments, a user sets a preference regarding the method used in measuring distances between objects.

FIG. 3A also shows the equidistant object relocating system determining the distance between the subject object 302 and a first right overlapping object 306a as the second distance d2. In particular, upon determining the first distance d1 with the first left overlapping object 304a, the equidistant object relocating system determines the distance between the subject object 302 and the closest overlapping object in the right set of overlapping objects 306. For example, in one or more embodiments, the equidistant object relocating system traverses the right set of overlapping objects 306 to identify the first right overlapping object 306a as being closest to the subject object 302, in a similar manner as described above.

Upon determining the first distance d1 and the second distance d2, the equidistant object relocating system determines whether the first left overlapping object 304a is located roughly the same distance from the subject object 302 as the first right overlapping object 306a. Specifically, the equidistant object relocating system compares the first distance d1 to the second distance d2 to determine whether the two distances are similar in length. More specifically, the equidistant object relocating system determines whether the first distance d1 and the second distance d2 are within a threshold tolerance distance (e.g., 4, 10, 16, 20 pixels, etc.) of each other. Stated differently, the equidistant object relocating system determines whether the difference between first distance d1 and the second distance d2 is less than a threshold tolerance.

If the first distance d1 is within the threshold tolerance of the second distance d2, then the equidistant object relocating system determines an equidistant position based on the first left overlapping object 304a and the first right overlapping object 306a (as described in greater detail in connection with FIG. 3D). Otherwise, the equidistant object relocating system continues to traverse either the left set of overlapping objects 304 or the right set of overlapping objects 306 to identify objects that satisfy the threshold tolerance.

To illustrate, in relation to FIG. 3A, the equidistant object relocating system determines that the two distances d1, d2 are not within the threshold tolerance (e.g., threshold distance) of each other. Accordingly, the equidistant object relocating system continues to traverse through the sets of overlapping objects 304, 306, based on distance form the subject object 302 (e.g., based on objects in closest proximity to the subject object 302). Specifically, the equidistant object relocating system first determines whether to traverse the left set of overlapping objects 304 or the right set of overlapping objects 306 to identify the next closest overlapping object. In some embodiments, the equidistant object relocating system determines which set of overlapping objects to traverse based on which of the two distances d1, d2 is shorter. By selecting the overlapping object set associated with the shorter distance, the equidistant object relocating system can systematically traverse each overlapping object, regardless of set, from nearest to farthest (or vice-versa), with a single pass through the sets of overlapping objects, and thus, avoiding redundant computations. In other words, the equidistant object relocating system can discard (e.g., dismiss) the closest object and analyze the next closest object in the same overlapping object set.

As shown in FIG. 3A, the second distance d2 is shorter than the first distance d1. As such, the equidistant object relocating system dismisses the first right overlapping object 306a and traverses the right set of overlapping objects 306 to identify the next closest overlapping object in the right set of overlapping objects 306. Specifically, the equidistant object relocating system moves from the first right overlapping object 306a to next overlapping object (e.g., the second right overlapping object 306b) within the right set of overlapping objects 306. If the right set of overlapping objects 306 is arranged based on proximity to the subject object 302, then the second right overlapping object 306b is the next overlapping object in the set of right overlapping objects 306. Otherwise, the equidistant object relocating system compares the distances between the second right overlapping object and the remaining overlapping objects (if present) in the right set of overlapping objects 306 to determine the next closest overlapping object to the subject object 302.

As shown in FIG. 3B, the equidistant object relocating system determines a third distance d3 between the subject object 302 and the second right overlapping object 306b (i.e., based on the second right overlapping object 306b being the next closest overlapping object to the subject object 302). Moreover, as just described, the equidistant object relocating system determines whether the first distance d1 and the third distance d3 are roughly equal in length (e.g., whether the difference between the distance d1 and the distance d3 is within the threshold tolerance).

If the first distance d1 and the third distance d3 do not satisfy the threshold tolerance, the equidistant object relocating system moves to the next closest overlapping object, as described above. For example, as shown in FIG. 3B, the first distance d1 is shorter than the third distance d3. As such, the equidistant object relocating system dismisses the first left overlapping object 304a, and identifies the next closest overlapping object from the left set of overlapping objects 304.

Figure 3C:
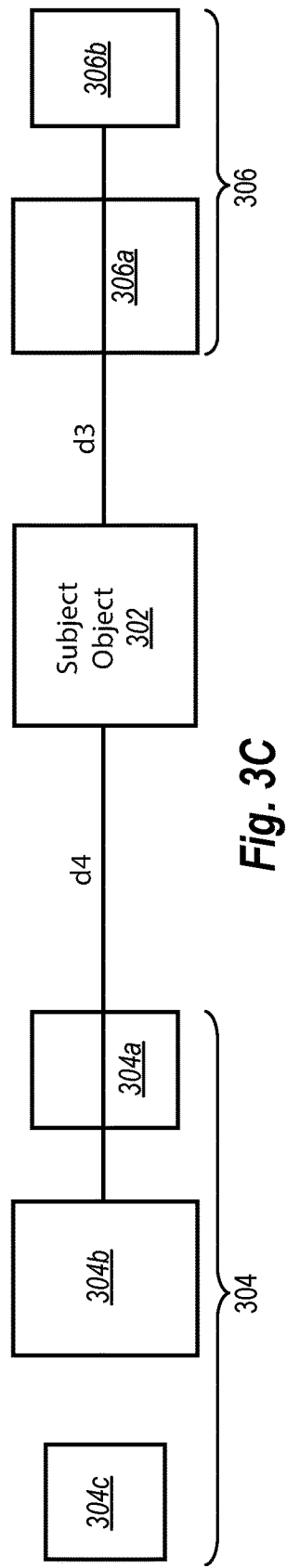

As FIG. 3C illustrates, the equidistant object relocating system identifies the second left overlapping object 304b as the next closest overlapping object in the left set of overlapping objects 304. Based on identifying the second left overlapping object 304b, the equidistant object relocating system determines the fourth distance d4 between the subject object 302 and the second left overlapping object 304b, as described above.

As mentioned above, the equidistant object relocating system can determine that two distances are within the threshold tolerance of each other. For example, as shown in FIG. 3C, the equidistant object relocating system determines that the difference between the third distance d3 and the fourth distance d4 is less than the threshold tolerance. Based on the third distance d3 and the fourth distance d4 satisfying the threshold tolerance, the equidistant object relocating system determines an equidistant position based on the second left overlapping object 304b and the second right overlapping object 306b. Further, the equidistant object relocating system stops traversing the sets of overlapping objects 304, 306.

Figure 3D:
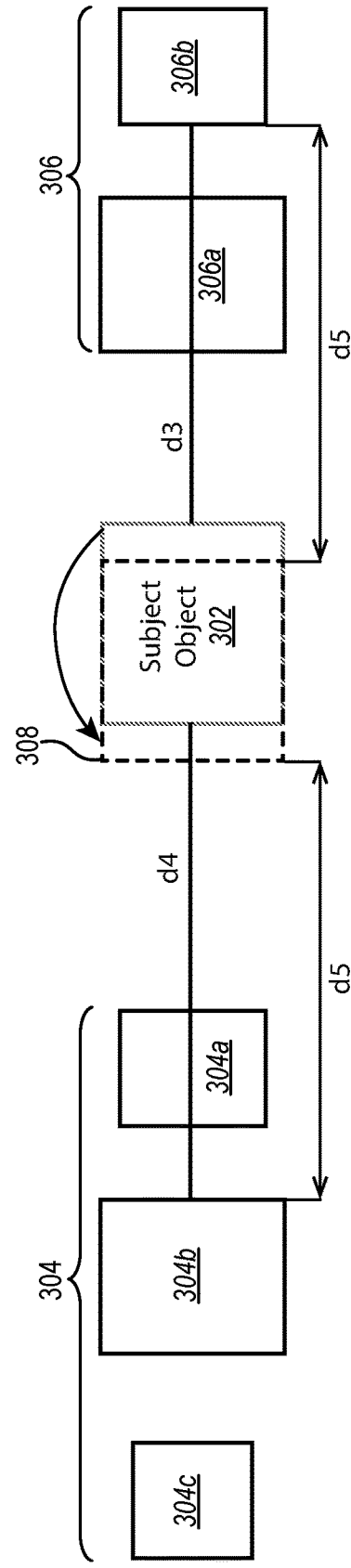

To illustrate, FIG. 3D shows the equidistant object relocating system determining an equidistant position 308 based on the second left overlapping object 304b and the second right overlapping object 306b. Specifically, based on the determination that the difference between the third distance d3 and the fourth distance d4 falls within the threshold tolerance, the equidistant object relocating system utilizes the positions of the second left overlapping object 304b and the second right overlapping object 306b to determine the equidistant position 308 for the subject object 302 (e.g., by averaging the x-coordinates of the second left overlapping object 304b and the second right overlapping object 306b to identify the equidistant position 308).

To illustrate, as shown in FIG. 3D, the equidistant object relocating system determines a fifth distance d5 or "equidistant length" that causes the subject object 302 to be positioned equally between the second left overlapping object 304b and the second right overlapping object 306b when moved to the equidistant position 308. In particular, the equidistant length of FIG. 3D evenly spaces the closest edges of the subject object 302, and the overlapping objects 304b, 306b (e.g., the gap between the objects is equal to the equidistant length). Rather than measuring the equidistant length from object edges (to create an equal gap between object edges), the equidistant object relocating system can also measure equidistant length from a different reference point. For example, the equidistant object relocating system can measure the equidistant length from the center of a subject object to the center of the corresponding overlapping objects (such that the distance between the center of each object is equal).

Using the equidistant length, the equidistant object relocating system can move or relocate the subject object 302 to the equidistant position 308. In one or more embodiments, the equidistant object relocating system shifts the subject object 302 along the x-axis until the center point of the subject object 302 relocates to the equidistant position 308 defined by the halfway distance. As shown in FIG. 3D, the equidistant object relocating system snaps the subject object 302 left to the equidistant position 308 such that the subject object 302 is equally spaced between the second left overlapping object 304b and the second right overlapping object 306b.

In many cases, moving the subject object 302 to the equidistant position 308 involves adjusting the horizontal position of the subject object 302 in a single direction. In these cases, the equidistant object relocating system maintains the vertical alignment of the subject object 302. In some cases, however, the equidistant object relocating system moves the subject object 302 to the equidistant position 308 between the two overlapping objects as well as adjusts the subject object 302 to vertically align with the overlapping objects. For example, in these cases, if the second left overlapping object 304b and the second right overlapping object 306b share a vertical alignment, the equidistant object relocating system also snaps the subject object 302 to the vertical alignment as part of snapping the subject object 302 to the equidistant position 308.

As mentioned above, in relation to FIG. 3D, the equidistant object relocating system stops traversing the sets of overlapping objects upon determining a pair of overlapping objects (e.g., the second left overlapping object 304b and the second right overlapping object 306b) used to determine the equidistant position 308. In alternative embodiments, the equidistant object relocating system can continue to traverse through the sets of overlapping objects to determine if another pair of overlapping objects yields a better equidistant position (e.g., two objects that have distances that are more similar than the distances d3, d4). Specifically, the equidistant object relocating system can compare the distances between the remaining left overlapping objects and the right overlapping objects, with respect to the subject object 302, to determine whether a pair of overlapping objects yield an equidistant position that is closer to the position of the subject object than the equidistant position 308 based on the second left overlapping object 304b and the second right overlapping object 306b.

In some embodiments, in searching for a pair of overlapping objects to determine an equidistant position, the equidistant object relocating system traverses through each overlapping object without identifying two overlapping objects that satisfy the threshold tolerance. Upon failing to identify overlapping objects that satisfy the threshold, in some embodiments, the equidistant object relocating system determines that no equidistant position exists for the subject object 302 given its current position. Alternatively, as described above, the equidistant object relocating system can also expand the scope of one or both sets of overlapping objects until identifying a pair of overlapping objects (or until the equidistant object relocating system hits a maximum limit of computations or objects).

While the above embodiments relate to traversing through the sets of overlapping objects from the closest to farthest overlapping objects, in various embodiments, the equidistant object relocating system can traverse through sets of overlapping objects in a different order based on the position of the subject object. For example, rather than beginning with the closest overlapping object and progressing toward the furthest overlapping object, the equidistant object relocating system can begin with the farthest overlapping objects and progresses toward the closest overlapping objects using the same approach described above.

Similarly, although the embodiment described in relation to FIGS. 3A-3D traverses through the sets of overlapping objects based on the next closest overlapping object in both sets of overlapping objects 304, 306, in some embodiments, the equidistant object relocating system traverses based on the next closest overlapping object in a single set of overlapping objects For example, the equidistant object relocating system can progress through each overlapping object in the left set of overlapping objects 304 and, for each overlapping object in the set, determine whether the right set of overlapping objects 306 has a matching overlapping object that satisfies the threshold tolerance. Indeed, this concept is a variation of the principles described below in connection with FIGS. 5A-6B.

As described above, the equidistant object relocating system traverses through a left set of overlapping objects 304 and a right set of overlapping objects 306 to move the subject object 302 to the equidistant position 308. Although illustrated as two different sets, the equidistant object relocating system can generate the sets as a combined set of overlapping objects or a single overlapping object array that includes the overlapping objects 304a-c, 306a-b. For example, if an array of overlapping objects is arranged based on the position of overlapping objects within a digital document (e.g., left-to-right), then the equidistant object relocating system traverses outward in both directions from the position of the subject object 302 within the overlapping object array. Thus, description herein that references multiple overlapping object sets or arrays can include a single, combined set or array. In other words, the first set of overlapping objects 304 and the second set of overlapping objects 306 may be the same set of overlapping objects.

As mentioned above, a computing device can repeat the process of snapping the subject object 302 to the equidistant position 308 as a user moves (e.g., drags) the subject object 302 within a digital document. Listing 3, shown below, provides an example pseudocode algorithm of the equidistant object relocating system determining the equidistant position for a subject object as it is moved within a digital document.

| Compute_Insert_Equal_Spacing( ) |
|---|
| {<br>  i = 0, j=0<br>  while(i < OverlappingLeftBoundsList.Size, ++i)<br>  {<br>    distLeft = Subject.Left – OverlappingLeftBoundsList[i].Right<br>    distRight = OverlappingRightBoundsList[j].Left – Subject.Right<br>    while(distRight < distLeft –ToleranceThreshold && ++j < OverlappingLeftBoundsList.Size)<br>    {<br>      distRight = OverlappingRightBoundsList [j]<br>    } |

| Compute_Insert_Equal_Spacing( ) |
|---|
|     if(Absolute(distRight – distLeft) <= ToleranceThreshold))<br>      return ((OverlappingLeftBoundsList[i].Right+<br>      OverlappingRightBoundsList [j].Left) / 2)<br>  }<br>  return null //No equidistant position found<br>} |

Listing 3

As shown in Listing 3, Compute_Insert_Equal_Spacing finds two overlapping objects that are equidistant from a subject object, where one of the overlapping objects lies to the left and another of the overlapping objects lies to the right side of a subject object. Further, the example pseudocode algorithm can build upon the example pseudocode algorithms provided in Listing 1 and Listing 2 above. In addition, the equidistant object relocating system can adapt the pseudocode of Listing 3 from a horizontal implementation (e.g., an application that identifies overlapping objects in a horizontal direction) to a vertical implementation (e.g., an implementation that identifies overlapping objects in a vertical direction) or an implementation in some other direction.

Further, Compute_Insert_Equal_Spacing has a worst-case time complexity of O(K), where K is the number of overlapping objects corresponding to the subject object, as described above. Accordingly, as mentioned above, the pseudocode of Listing 3 provides significantly improved computer processing than conventional systems that provide spacing guides. Indeed, by traversing through the overlapping object arrays (i.e., OverlappingLeftBoundsList and OverlappingRightBoundsList) in a particular order relative to the position of the subject object (e.g., in order of closest proximity from the subject object), the equidistant object relocating system can quickly and efficiently identify an equidistant position, without having to compare every reference object against every other reference object within the digital document.

As mentioned above, the equidistant object relocating system can determine an equidistant position based on overlapping objects that are roughly the same distance to the current position of a subject object. For example, as shown in FIG. 3D, based on determining that the fourth distance d4 is within the threshold tolerance of the third distance d3, the equidistant object relocating system utilizes the second left overlapping object 304b and the second right overlapping object 306b to determine the equidistant position 308. FIG. 4, described below, provides additional detail regarding the threshold tolerance in accordance with one or more embodiments.

As shown, FIG. 4 includes many of the elements shown in FIG. 3D. For example, FIG. 4 shows the subject object 302, the left set of overlapping objects 304, the right set of overlapping objects 306, the equidistant position 308, and the fifth distance d5. In addition, FIG. 4 includes an example threshold tolerance 410 (e.g., threshold distance).

The threshold tolerance 410 can be conceptualized or applied in a variety of different forms. For example, as described above, the threshold tolerance 410 can be conceptualized as a difference between distances. Specifically, in relation to FIGS. 3A-3D, threshold tolerance is described as a maximum difference of distances between multiple objects.

The equidistant object relocating system can also be conceptualized as a region (or position) relative to the subject object. Specifically, as shown in FIG. 4, the threshold tolerance 410 is presented as a region that, when the subject object moves into, the equidistant object relocating snaps the subject object to an equidistant position. More specifically, when a user fully moves the subject object 302 within the threshold tolerance 410 (as shown), the equidistant object relocating system can snap the subject object 302 to the equidistant position 308 based on the second left overlapping object 304b and the second right overlapping object 306b.

In relation to FIG. 4, the threshold tolerance 410 is illustrated such that it can encompass the subject object. Thus, the threshold tolerance 410 is based on the width of the subject object 302. For example, if the threshold has a tolerance of 10 pixels, the threshold tolerance equidistant object relocating system sets the width of the threshold tolerance 410 to be 10 pixels wider than the subject object 302. Further, in some embodiments, the equidistant object relocating system can center the threshold tolerance 410 on the equidistant position 308.

In some embodiments, a threshold tolerance is not based on the width of a subject object. For example, if a threshold tolerance is 10 pixels, the equidistant object relocating system locates the threshold tolerance on the equidistant position 308. If the user moves the subject object 302 such that the center of the subject object 302 satisfies the threshold tolerance (e.g., moves the center of the subject object 302 within the 10 pixels of the threshold tolerance), then the equidistant object relocating system can snap the subject object 302 to the equidistant position 308.

In sum, the threshold tolerance 410 can be described as a difference of distances between objects, as a region relative to an object (e.g., a region relative to the subject object or a region relative to a reference object), or as a position relative to an object (e.g., a position relative to the subject object or a position relative to a reference object). Notably, each of these formulations require the subject object to be in a position that is in close proximity to the equidistant position to satisfy the threshold tolerance and snap the subject object to an equidistant position.

Figure 5C:
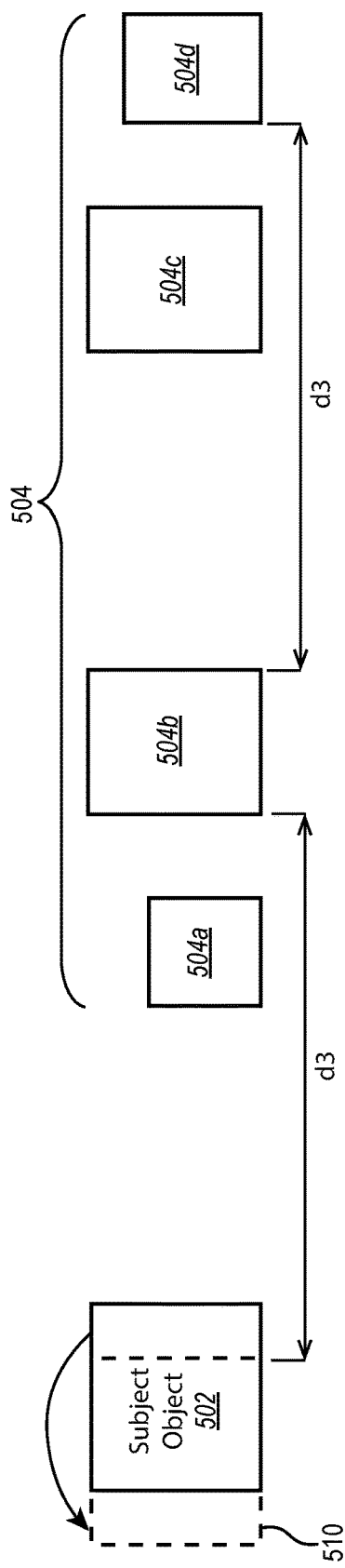

Moving to the next set of figures, FIGS. 5A-5C illustrate the equidistant object relocating system moving a subject object 502 to an equidistant position 510 based on overlapping objects 504a-d positioned to one side of the subject object 502. In particular, FIGS. 5A-5C show a right set of overlapping objects 504 generated by the equidistant object relocating system, as described above in connection with FIG. 2, based on the position of the subject object 502 within a digital document. Notably, while FIGS. 5A-5C is described with respect to reference objects positioned to the right of a subject object, similar principles apply to objects positioned to the left, above, or below the subject object within a digital document.

As shown in FIG. 5A, the equidistant object relocating system traverses through the right set (e.g., array) of overlapping objects to determine an equidistant position for the subject object 502. Specifically, the equidistant object relocating system traverses the right set of overlapping objects 504 to identify the first right overlapping object 504a, which is positioned closest to the subject object 502. If the right set of overlapping objects 504 is sorted based on proximity to the subject object 502, the equidistant object relocating system can jump to the first (or last) entry in the set, as described above. Otherwise, equidistant object relocating system can compare the distance between the subject object 502 and each object in the right set of overlapping objects 504. Even in this latter case, because the right set of overlapping objects 504 is often a subset of all the objects in a digital document, identifying the overlapping object in the set that is the shortest (or longest) distance to the subject object 502 takes less computational cycles than conventional design systems.

Upon identifying the first right overlapping object 504a as the closest overlapping object in the right set of overlapping objects 504, the equidistant object relocating system determines a distance between the subject object 502 and the first right overlapping object 504a. The equidistant object relocating system measures the horizontal distance (with respect to the digital document) between the two objects. More specifically, in one or more embodiments, the equidistant object relocating system measures the distance between the x-coordinate of the subject object 502 and the x-coordinate of the first right overlapping object 504a, as described above.

As shown, the equidistant object relocating system determines the first distance d1 as the distance between the right edge of the subject object 502 and the left edge of the first right overlapping object 504a. As described above, the equidistant object relocating system can determine the distance between two objects utilizing a variety of approaches. For example, the equidistant object relocating system measures the first distance between the center of the subject object 502 and the center of the first right overlapping object 504a.

Based on the first distance d1, the equidistant object relocating system can search for a matching overlapping object in the right set of overlapping objects 504. To explain, in order for the equidistant object relocating system to determine an equidistant position based on the first right overlapping object 504a, the equidistant object relocating system searches for an overlapping object in the right set of overlapping objects 504 that is the same distance from the first right overlapping object 504a as the first right overlapping object 504a is from the subject object 502 (i.e., the first distance d1). Therefore, the equidistant object relocating system applies the first distance d1 to the end (i.e., the right edge) of the first right overlapping object 504a to determine if another overlapping object is positioned the first distance d1 from the first right overlapping object 504a. As shown, FIG. 5A includes a search position 506a at the end of the first distance d1 extending from the first right overlapping object 504a.

It is unlikely that the equidistant object relocating system will identify another overlapping object in the right set of overlapping objects 504 that is exactly at the search position 506a. Accordingly, the equidistant object relocating system can expand the search range to identify overlapping objects in the right set of overlapping objects 504 that are roughly the same distance to the first right overlapping object 504a as the first right overlapping object 504a is from the subject object 502. Therefore, the equidistant object relocating system applies a threshold tolerance 508 (e.g., 4, 8, 10, or 20, pixels) to expand the search position 506a to a search range. As shown, the search range is indicated as the threshold tolerance 508, which the equidistant object relocating system can use to set the parameters of the search range.

By employing the threshold tolerance 508 to specify a search range within the right set of overlapping objects 504, the equidistant object relocating system searches only a subset of objects within the set, rather than every object, which provides the benefit of reduced processing requirements on a computing device. For example, if the search point is at the x-coordinate 65, and the threshold tolerance is 10, then the equidistant object relocating system expands the search range to include overlapping objects in the right set of overlapping objects 504 having an x-coordinate between 60-70 (e.g., plus and minus half the threshold tolerance 508). In this manner, the equidistant object relocating system can limit the search to overlapping objects in a particular range (in cases where the set of overlapping objects is arranged based on proximity to a subject object).

Notably, the threshold tolerance 508 shown in FIG. 5A can be the same or a different threshold tolerance than described in previous embodiments. For example, the threshold tolerance 508 in FIG. 5A is wider or narrower than the threshold tolerance 410. Moreover, although FIG. 5A illustrates the threshold tolerance 508 as centered on the search position 506a, the equidistant object relocating system can apply the threshold tolerance 508 such that it is not centered on the search position 506a (e.g., x-coordinate 61-71 from the previous example).

As mentioned above, the equidistant object relocating system can traverse through an overlapping objects array based on position until identifying matching overlapping objects. For example, as shown in FIG. 5A, the equidistant object relocating system does not identify any overlapping objects within the right set of overlapping objects 504 that satisfy the tolerance threshold 508. Upon determining that no overlapping objects are within the search range, the equidistant object relocating system traverses the right set of overlapping objects 504 to identify the next closest overlapping object with respect to the subject object 502. Then, the equidistant object relocating system repeats the process of searching for a matching object that satisfies the tolerance threshold.

To illustrate, FIG. 5B shows the equidistant object relocating system identifying the second right overlapping object 504b as the next closest overlapping object in the right set of overlapping objects 504. In addition, the equidistant object relocating system determines the second distance d2 as the distance between the subject object 502 and second right overlapping object 504b. Using the second distance d2, the equidistant object relocating system determines the search position 506b and determines whether there exists another overlapping object in the right set of overlapping objects 504 that is within the search range associated with the updated search position 506b given the threshold tolerance 508.

As shown in FIG. 5B, the equidistant object relocating system identifies the fourth right overlapping object 504d within the search range associated with the updated search position 506b. In particular, the equidistant object relocating system determines that while not exactly at the updated search position 506b, the fourth right overlapping object 504d falls within the search range associated with the updated search position 506b. Therefore, the equidistant object relocating system determines that the fourth right overlapping object 504d is roughly the same distance to the second right overlapping object 504b as the second right overlapping object 504b is to the subject object 502. In other words, the distance between the subject object 502 and the second right overlapping object 504b (i.e., the second distance d2) is within the threshold tolerance 508 of the distance between the second right overlapping object 504b and the fourth right overlapping object 504d.

In addition, as part of searching for an overlapping object within the search range, the equidistant object relocating system can search for a specific point on an overlapping object. For example, as shown in FIG. 5B, the equidistant object relocating system searches for overlapping objects have a left edge within the search range indicated by the threshold tolerance 508. Therefore, the equidistant object relocating system determines that the third right overlapping object 504c is not located in the search range because the left edge of the third right overlapping object 504c is outside of the search range.

Although the embodiment of FIG. 5B searches for objects that have a left edge within the search range, in other embodiments, the equidistant object relocating system can search for objects based on different criteria. For example, the equidistant object relocating system can search for a matching object with a center position within the search range. Similarly, the equidistant object relocating system can search for a matching object with a right edge within the search range. Moreover, the equidistant object relocating system can search for a matching object with any point within the search range.

In some embodiments, the equidistant object relocating system identifies multiple overlapping objects within the search range. For example, in embodiments that search for objects that have any points within the search range, the equidistant object relocating system can determine that both the third right overlapping object 504c and the fourth overlapping object 504d satisfy the tolerance threshold. Additional detail regarding embodiments of the equidistant object relocating system that identify multiple overlapping objects within a search range are described below in connection with FIGS. 6A and 6B.

As shown in FIG. 5C, upon determining the second right overlapping object 504b and the fourth right overlapping object 504d satisfy the tolerance threshold 508, the equidistant object relocating system can use the second right overlapping object 504b and the fourth right overlapping object 504d to determine an equidistant position for the subject object 502. In particular, the equidistant object relocating system can relocate the subject object 502 to an equidistant position such that the subject object 502 is the same distance from the second right overlapping object 504b as the second right overlapping object 504b is from the fourth right overlapping object 504d. In this manner, the subject object 502, the second right overlapping object 504b, and the fourth right overlapping object 504d are equally spaced.

To illustrate, FIG. 5C shows the equidistant object relocating system determining a third distance d3 between the second right overlapping object 504b and the fourth right overlapping object 504d. For example, the equidistant object relocating system subtracts the x-coordinate of the second right overlapping object 504b from the corresponding x-coordinate of the fourth right overlapping object 504d (or vice-versa using the absolute value) to calculate the positive horizontal distance (e.g., the third distance d3) between the two objects.

Using the third distance d3, the equidistant object relocating system can determine the equidistant position 510. As shown, the equidistant object relocating system applies the third distance d3 to the left edge of the second right overlapping object 504b to identify the position of the equidistant position 510. In some embodiments, the equidistant object relocating system subtracts the third distance d3 from the x-coordinate of the second right overlapping object 504b (e.g., the left edge) to calculate an x-coordinate of the equidistant position 510 (e.g., the right edge). In alternative embodiments, the equidistant object relocating system determines the equidistant position (e.g., the center)

given the third distance d3 and the center position of the second right overlapping object 504*b*.

As shown in FIG. 5C, the equidistant object relocating system moves the subject object 502 to the equidistant position 510 such that the second right overlapping object 504*b* is equidistant with the subject object 502 and the fourth right overlapping object 504*d*. In relation to the embodiment of FIG. 5C, upon determining the equidistant position 510, the equidistant object relocating system halts additional computations to determine an equidistant position based on other overlapping objects in the right set of overlapping objects 504. In addition, the equidistant object relocating system can stop future computations of determining an equidistant position for the subject object 502 based on overlapping objects surrounding the subject object 502 or an equidistant position for the subject object 502 based on overlapping objects located in other directions (e.g., left, top, or bottom).

The equidistant object relocating system can determine when to halt computations based on a variety of factors, depending on the embodiments. As just mentioned, the equidistant object relocating system can halt computations upon identifying an equidistant position. In one or more embodiments, the equidistant object relocating system can also halt computations when the search range is located past the last overlapping object in the set of overlapping objects. For example, if the equidistant object relocating system determines that the search range extends beyond the last overlapping object in the right set of overlapping objects 504, then the equidistant object relocating system stops searching for a matching overlapping object that lies within the search range. Further, the equidistant object relocating system stops traversing through the right set of overlapping objects 504 as each next closest overlapping object would also produce a search range beyond the last overlapping object in the set.

In some embodiments, upon determining that, based on the position of the subject object 502, that no pair of overlapping objects in the right set of overlapping objects 504 are suitable to determine an equidistant position, the equidistant object relocating system attempts to determine an equidistant position based on other sets of overlapping objects. For example, the equidistant object relocating system repeats the above process using overlapping objects positioned to the left of the subject object 502. Additionally, or alternatively, the equidistant object relocating system determines whether a top set of overlapping objects or a bottom set of overlapping objects yields an equidistant position for the subject object 502.

As mentioned above, in some circumstances, the equidistant object relocating system identifies multiple overlapping objects that satisfy a threshold tolerance. In these circumstances, the equidistant object relocating system can select one of the overlapping objects to use in determining the equidistant position for the subject object. To illustrate, FIGS. 6A and 6B illustrate the equidistant object relocating system determining an equidistant position 610 for a subject object 602 based on a closest matching overlapping object in accordance with one or more embodiments. As shown, FIGS. 6A and 6B include a subject object 602 and a right set of overlapping objects 604, including a first right overlapping object 604*a*, a second right overlapping object 604*b*, a third right overlapping object 604*c*, and a fourth right overlapping object 604*d*.

In particular, FIG. 6A illustrates the equidistant object relocating system determining a first distance d1 between the subject object 602 and the first right overlapping object 604*a*. In addition, as described above, the equidistant object relocating system identifies a search position 606 that is the first distance d1 from the first right overlapping object 604*a*. Further, as shown, the search position 606 is expanded by a threshold tolerance 608 to create a search range that the equidistant object relocating system utilizes to identify one or more overlapping objects in the right set of overlapping objects 604 that satisfy the threshold tolerance 608.

As also shown in FIG. 6A, the equidistant object relocating system determines that three overlapping objects fall within the search range associated with the search position 506*a* given the position of the subject object 502. In particular, based on comparing x-coordinates of overlapping objects to the search range, the equidistant object relocating system determines the second right overlapping object 504*b*, the third right overlapping object 504*c*, and the fourth right overlapping object 504*d* as satisfying the threshold tolerance 608.

In relation to FIG. 6A, upon determining that multiple overlapping objects satisfy the threshold tolerance 608, the equidistant object relocating system determines which of the overlapping object is closest to the search position 606 (e.g., which is the best match). For example, the equidistant object relocating system calculates the distance between the left edge of each of the overlapping objects in the search range and the search position 606. As shown in FIG. 6A, the equidistant object relocating system calculates a second distance d2 between the second right overlapping object 604*b* and the search position 606, a third distance d3 between the third right overlapping object 604*c* and the search position 606, and a fourth right distance d4 between the fourth right overlapping object 604*d* and the search position 606. Upon calculating the multiple distances (e.g., d2-d4), the equidistant object relocating system identifies the shortest distance. In this manner, the equidistant object relocating system identifies the overlapping object located closest to the search position 606 (e.g., the closest match).

In addition to calculating distances from the search position 606, the equidistant object relocating system can utilize a variety of approaches to determining which overlapping object is the best match. For example, rather than calculating distances from the search position 606, the equidistant object relocating system can measure the distance from the first right overlapping object 604*a* and select the overlapping object with a distance from the first right overlapping object 604*a* that is nearest to the distance d1.

Furthermore, rather than selecting the closest match, in one or more embodiments, the equidistant object relocating system can utilize other techniques to select a matching overlapping object. For example, the equidistant object relocating system can select the overlapping object positioned farthest from the search position 606, or select the first or last overlapping object identified in the search area. In another example, the equidistant object relocating system prioritizes positive distance (or farther from the subject object 602) over negative distance. In such embodiments, for example, the equidistant object relocating system prioritizes the third right overlapping object 604*c* over the fourth right overlapping object 604*d* (and prioritizes the fourth right overlapping object 604*d* over the second right overlapping object 604*b*).

Upon selecting an overlapping object within the search range, the equidistant object relocating system can use the selected overlapping object to determine an equidistant position for the subject object 502. To illustrate, FIG. 6B shows the equidistant object relocating system utilizes the first right overlapping object 604*a* and the second right overlapping object 604b (i.e., the closest matching overlapping object) to determine the equidistant position 610 for the subject object 602. As described above, the equidistant object relocating system determines the distance between the first right overlapping object 604a and the second right overlapping object 604b (i.e., the fifth distance d5 or equidistant length). The equidistant object relocating system then utilizes the distance d5 to determine the equidistant position 610 and relocate the subject object 602 to the equidistant position 610.

Listing 4, shown below, provides an example pseudocode algorithm of the equidistant object relocating system determining the equidistant position for a subject object based on overlapping objects located on the same side of the subject object. In addition, Listing 4 includes identifying the closest matching overlapping object when multiple overlapping objects are identified within the search range indicated by the threshold tolerance. One will appreciate that different portions of Listing 4 can be employed in different embodiments. For example, one can employ portions of the algorithm for determining the equidistant position for a subject object without employing the closest matching portion of the example pseudocode algorithm provided in Listing 4.

In addition, Listing 4 denotes finding two overlapping objects on the right side of the subject object such that the overlapping object in the middle is equidistant from the subject object and the other overlapping object. However, one will appreciate that the equidistant object relocating system can apply similar pseudocode to determine an equidistant position for a subject object based on overlapping objects positioned in other directions (e.g., left, up, or down) from the subject object.

```
Compute_Insert_Spacing_Constraint_Based_On_Adjacent_Gap_In_RightSide( )

{
  i = 0
  Size = OverlappingRightBoundsList.Size
  RightMostRange = OverlappingRightBoundsList[Size – 1].Left //Last object to the
  right of subject
  while(i < OverlappingRightBoundsList.Size, ++i)
  {
    distRight = OverlappingRightBoundsList [i].Left – Subject.Right
    ProbableOtherObjectBoundsPosition = OverlappingRightBoundsList[i].Right +
    distRight
    if(ProbableOtherObjectBoundsPosition > RightMostRange +
    ToleranceThreshold)
        return;
    //If i-th object is going to be used to determine an equidistant position, then there
    must exist some other object within the range of
    [ProbableOtherObjectBoundsPosition – ToleranceThreshold to
    ProbableOtherObjectBoundsPosition + ToleranceThreshold]
    LowerIndex = BinarySearch_Lower(OverlappingRightBoundsList,
    ProbableOtherObjectBoundsPosition – ToleranceThreshold)
    UpperIndex = BinarySearch_Lower(OverlappingRightBoundsList,
    ProbableOtherObjectBoundsPosition + ToleranceThreshold)
    //LowerIndex is equal to UpperIndex when there is not an overlapping object is
    found within the search range
    MinInacuracy = FLOAT_MAX
    IdentifiedOtherObjectsIndex = INT_MAX
    SelectedOtherObjectPosition = NULL
    while(LowerIndex <= UpperIndex)
    {
        Inaccuracy = Absolute(ProbableOtherObjectBoundsPosition –
        OverlappingRightBoundsList[LowerIndex].Left)
        if(Inaccuracy < ToleranceThreshold && Inaccuracy < MinInacuracy)
        {
            MinInacuracy = Inaccuracy
            IdentifiedOtherObjectsIndex = LowerIndex
        }
        ++LowerIndex
    }
    if(SelectedOtherObjectPosition != NULL)
        return (OverlappingRightBoundsList[SelectedOtherObjectPosition])
  }
}
```

Listing 4

As mentioned above and as shown in Listing 4, the example algorithm of Compute_Insert_Spacing_Constraint_Based_On_Adjacent_Gap_In_RightSide finds, based on a first overlapping object, one or more additional overlapping objects that are positioned within the threshold tolerance of the first overlapping object, based on the first overlapping object's distance to the subject object. In addition, if multiple additional overlapping objects are identified, the example algorithm includes pseudocode for selecting the additional overlapping object that most-closely matches the first overlapping object's distance to the subject object.

Notably, Listing 4 has a worst-case time complexity of O(K log K) due to employing an N-time binary search, and where N is the number of objects in a digital document and K is the number of overlapping objects corresponding to the subject object. Thus, as mentioned above, the worst-case time complexity in accordance with this embodiment of the equidistant object relocating system is a significant improvement over conventional design systems.

Although the exemplary embodiments of the foregoing figures describe relocating a subject object to an equidistant position, in one or more embodiments, the equidistant object relocating system provides multiple equidistant position guides in multiple different directions. Indeed, FIG. 7 illustrates the equidistant object relocating system providing multiple equidistant position guides to a subject object within a digital document in accordance with one or more embodiments. In particular, FIG. 7 illustrates a client device 700 displaying a graphical user interface that includes an object design application 702, such as ADOBE® ILLUSTRATOR®, that implements the equidistant object relocating system. The object design application 702 can include various tools provided in a toolbar 704 to assist a user in adding, removing, and/or editing design object in a digital document 706. For example, the object design application 702 enables a user to add and move objects within the digital document 706. It should be noted that the object design application 702 can include additional or fewer tools and/or features than shown in FIG. 7.

As illustrated in FIG. 7, the digital document 706 includes a subject object 708 and reference objects 710. Moreover, as shown, the equidistant object relocating system receives user input, such as a drag command, that moves 712 the subject object 708 from a previous position 714 to a current position 716. Then, based on the current position 716, the equidistant object relocating system snaps 718 the subject object 708 to an equidistant position 720. In this manner, the equidistant object relocating system moves the subject object 708 from the current position 716 to the equidistant position 720.

In one or more embodiments, the act of moving 712 the subject object 708 from the previous position 714 to the current position 716 includes moving a representation of the subject object 708 (e.g., a visual copy of the subject object 708, an outline of the subject object 708, or a subject object placeholder). Moreover, moving the subject object from the current position 716 to the equidistant position 720 includes moving (e.g., snapping) a representation of the subject object 708 to the equidistant position 720. For example, a user selects (e.g., clicks), holds, and drags (e.g., moves 712) the subject object 708 to the current position 716. In response, the equidistant object relocating system displays the subject object 708 in the previous position 714 and a representation of the subject object 708 being moved to the current position 716. Moreover, the equidistant object relocating system automatically snaps (i.e., moves) the representation of the subject object 708 to the equidistant position 720. Thus, moving the subject object 708 to the equidistant position 720 can include snapping a representation of the subject object 708 to the equidistant position 720.

Upon detecting a release event for the subject object 708, (e.g., the user unclicks the representation of the subject object 708), the equidistant object relocating system can finalize the movement of the subject object 708 to the equidistant position 720 (e.g., by no longer displaying the subject object 708 in the previous position 714). Alternatively, upon receiving user input canceling (or undoing) the move (e.g., pressing the "escape" key while still dragging the representation of the subject object 708), the equidistant object relocating system leaves the subject object 708 in the previous position 714.

As shown in FIG. 7, the equidistant object relocating system can determine the equidistant position 720 based on the horizontal and vertical positioning of the subject object (i.e., the current position 716). Further, as shown, the equidistant object relocating system can determine the equidistant position 720 based on employing multiple systems and methods described herein.

To illustrate, the equidistant object relocating system determines the equidistant position 720 based on the subject object 708 being roughly equidistant (e.g., within a threshold tolerance) with overlapping objects 722a-b in a sequence with the subject object 708, where the subject object 708 is the last object in the sequence. As described above, the equidistant object relocating system can determine, based on the current position 716 of the subject object 708, that the equidistant position 720 is a first distance d1 from a first left overlapping object 722a, that the first left overlapping object 722a is also the first distance d1 from the second left overlapping object 722b, and that the current position 716 is within a threshold tolerance of the equidistant position 720. Accordingly, the equidistant object relocating system can snap 718 (along the x-axis) the subject object 708 from the current position 716 to the equidistant position 720.

Concurrently, as shown, the equidistant position determines the equidistant position 720 based on the current position 716 of the subject object 708 being roughly equidistant between two overlapping objects (e.g., a top overlapping object 724 and a bottom overlapping object 726 satisfy the threshold tolerance relative to the current position 716). As described above, the equidistant object relocating system can determine, based on the current position 716 of the subject object 708, that the equidistant position 720 is a second distance d2 between the top overlapping object 724 and the bottom overlapping object 726 and that the equidistant position 720 is within a threshold tolerance of the current position 716. Accordingly, the equidistant object relocating system can snap 718 (along the y-axis) the subject object 708 from the current position 716 to the equidistant position 720.

Thus, as shown, the equidistant object relocating system can move the subject object 708 to the equidistant position 720, which is equidistant in both a vertical and horizontal direction relative to other subject objects. Specifically, the equidistant position 720 is in an equidistant position between two reference objects in a vertical direction and in an equidistant position at the end of a sequence of reference objects in a horizontal direction.

In one or more embodiments, when determining an equidistant position using multiple operations and techniques, the equidistant object relocating system applies an order with respect to the various operations and techniques. For example, in one or more embodiments, the equidistant object relocating system first determines whether a subject object is located between one or more overlapping objects, and if so, whether the subject object can be snapped to an equidistant position between a pair of surrounding overlapping objects. For instance, the equidistant object relocating system can first analyze horizontal overlapping objects to determine an equidistant position based on surrounding overlapping objects (e.g., as shown in FIG. 1A), then analyze vertical overlapping objects to determine an equidistant position based on surrounding overlapping objects.

If the equidistant object relocating system identifies a horizontal and/or vertical equidistant position based on surrounding overlapping objects, the equidistant object relocating system can stop further processing. Otherwise, the equidistant object relocating system can progress to the next set of operations and techniques. For example, in some embodiments, the equidistant object relocating system next determines if the subject object is at the end (i.e. either the front end or the back end) of an equidistant sequence with at least two overlapping objects (e.g., as shown in FIG. 1B). Specifically, the equidistant object relocating system can look to the right direction to identify a sequence of objects and an equidistant position (e.g., as shown in FIG. 1B), then the equidistant object relocating system can look to the right direction to identify a sequence of objects and an equidistant position. As with the above operations and techniques, the equidistant object relocating system can prioritize horizontal operations over vertical operations (or vice versa). In addition, while one example order of operations is provided, the equidistant object relocating system can prioritize the various systems and methods in any order. Further, the equidistant object relocating system can receive user input specifying a priority order of operations.

Returning to FIG. 7, the digital document 706 shows the first distance d1 and the second distance d2 as guides within the object design application 702. In some embodiments, the equidistant object relocating system displays guides that reflect actual lengths. For example, in relation to FIG. 7, the equidistant object relocating system displays the first distance d1 and the second distance d2 as actual lengths (e.g., in pixels or another measurement unit). Additionally, or alternatively, in one or more embodiments, the equidistant object relocating system provides an indicator as to which reference objects it utilizes to generate the equidistant position 720. For example, the equidistant object relocating system can highlight the reference objects or provide guide lines from the reference objects as an indication of which reference objects are utilized to determine the equidistant position 720.

Figure 8:
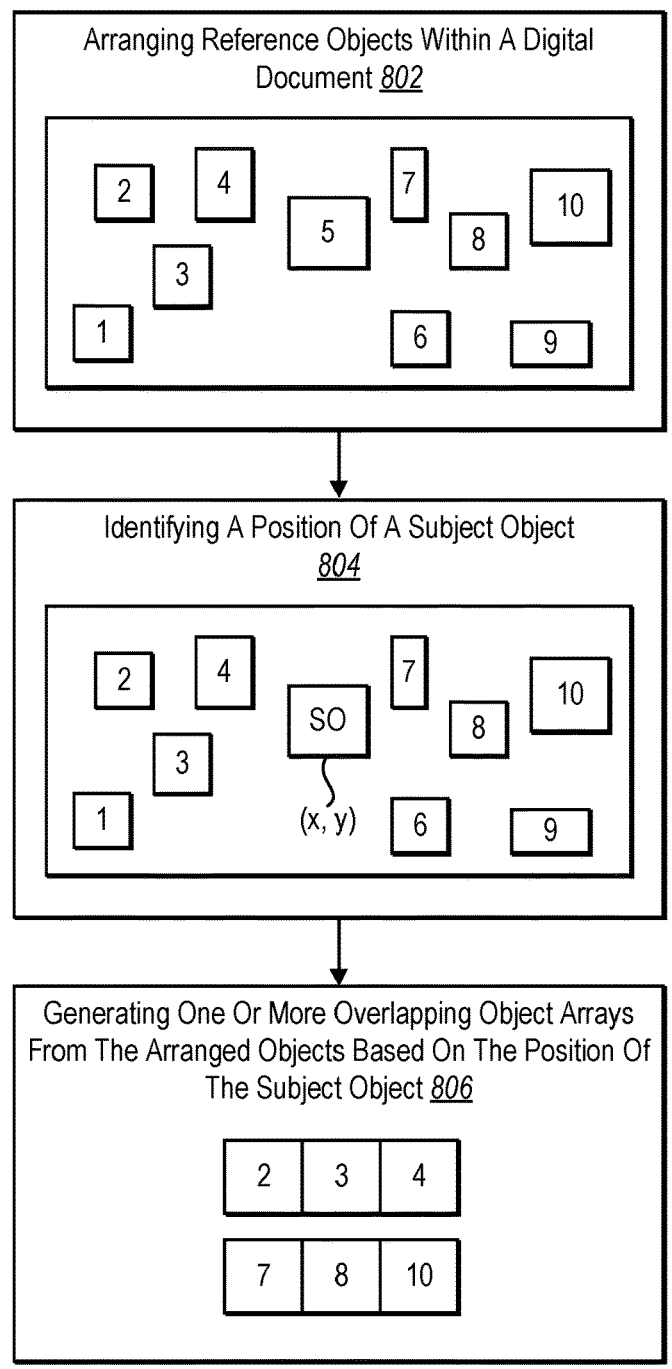
FIG. 8 illustrates acts in a step for generating one or more overlapping objects arrays based on a subject object in accordance with one or more embodiments.

Turning now to FIG. 8 additional detail is provided regarding generating overlapping object arrays in accordance with one or more embodiments. In particular, FIG. 8 illustrates acts in performing a step 800 for generating one or more overlapping objects arrays based on the subject object. In particular, FIG. 8 includes acts 802-806 for performing the step 800.

As illustrated, FIG. 8 includes an act 802 of arranging reference objects within a digital document. For example, the equidistant object relocating system generates one or more object caches or lists, as described above, that organize objects in a digital document based on their position within the digital document. In some embodiments, the equidistant object relocating system arranges reference objects left-to-right and/or right-to-left. In some embodiments, the equidistant object relocating system arranges reference objects top-to-bottom and/or bottom-to-top. As shown, the act 802 includes a graphic of a digital document where objects are numbered 1-10 based on their left-to-right arrangement. Additional detail regarding arranging reference objects within a digital document is provided above, such as in connection with FIG. 2

In addition, FIG. 8 shows an act 804 of identifying a position of a subject object (labeled as "SO"). In particular, the act 804 can involve identifying a coordinate of a point on the subject object within the digital document, as described above. For example, and as shown, the equidistant object relocating system identifies (x, y) coordinates (or (x, y, z) 3D coordinates) for the center point of the subject object within a digital document. In another example, identifying the position includes identifying multiple points of the subject object (e.g., a top point, a bottom point, a left point, and/or a right point). Further, as described previously, the equidistant object relocating system can update the position of a subject object as the subject object moves within a digital document based on received user input (e.g., mouse movements). Additional detail regarding identifying a position of a subject object is described previously, such as in connection with FIG. 2.

Further, FIG. 8 includes an act 806 of generating one or more overlapping object arrays from the arranged objects based on the position of the subject object. In one or more embodiments, the equidistant object relocating system uses the position of the subject object to determine which reference objects in the arrangement of reference objects overlap the subject object. Further, in additional embodiments, the equidistant object relocating system identifies whether reference objects are located in a region projected from the subject object. For example, the equidistant object relocating system identifies a reference object as an overlapping object based on identifying a point on the reference objects that shares a linear plane with a point on the subject object, where the linear plane is parallel to the projected region. In one or more embodiments, the equidistant object relocating system generates a first overlapping objects array by determining reference objects that overlap a first region projected from the subject object in a first direction and a second overlapping objects array by determining reference objects that overlap a second region projected from the subject object in a second direction that is opposite to the first direction. In alternative embodiments, the equidistant object relocating system generates an overlapping object array by identifying reference objects positioned in a first direction from the subject object where a point on the reference objects shares a linear plane with a point on the subject object.

Upon identifying overlapping objects, the equidistant object relocating system can construct one or more overlapping object arrays, as described above. For example, the equidistant object relocating system generates an overlapping object array by pushing reference objects that are located directly on one side of the subject object onto an overlapping object array. As shown, the equidistant object relocating system pushes reference objects 2, 3, 4 into a first overlapping object array and reference objects 7, 8, and 10 into a second overlapping object array. Additional detail regarding generating one or more overlapping object arrays is provided above, such as in connection with FIG. 2.

Figure 9A:
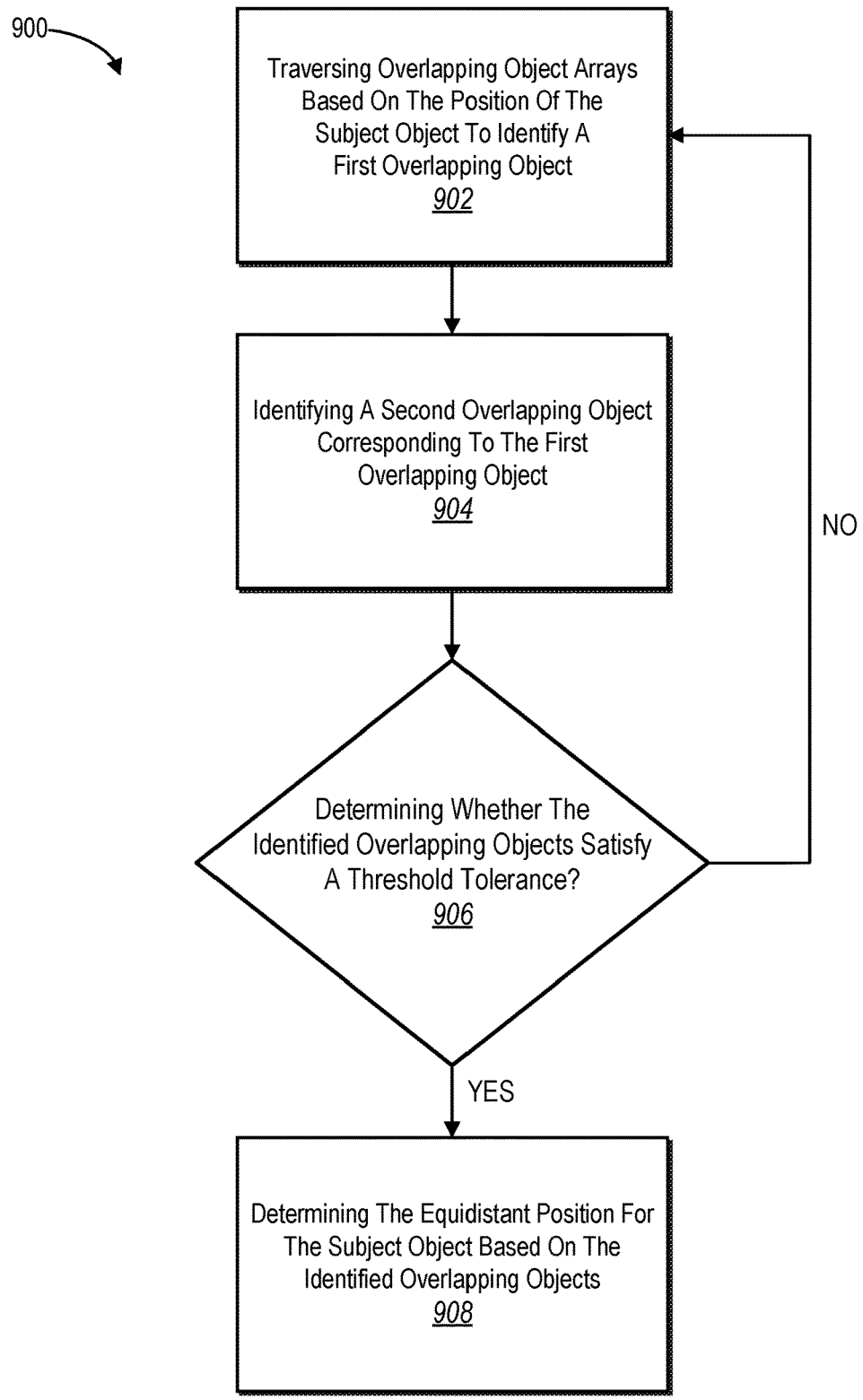
FIGS. 9A and 9B illustrate acts in a step for determining an equidistant position for a subject object based on overlapping objects in accordance with one or more embodiments.
Figure 9B:
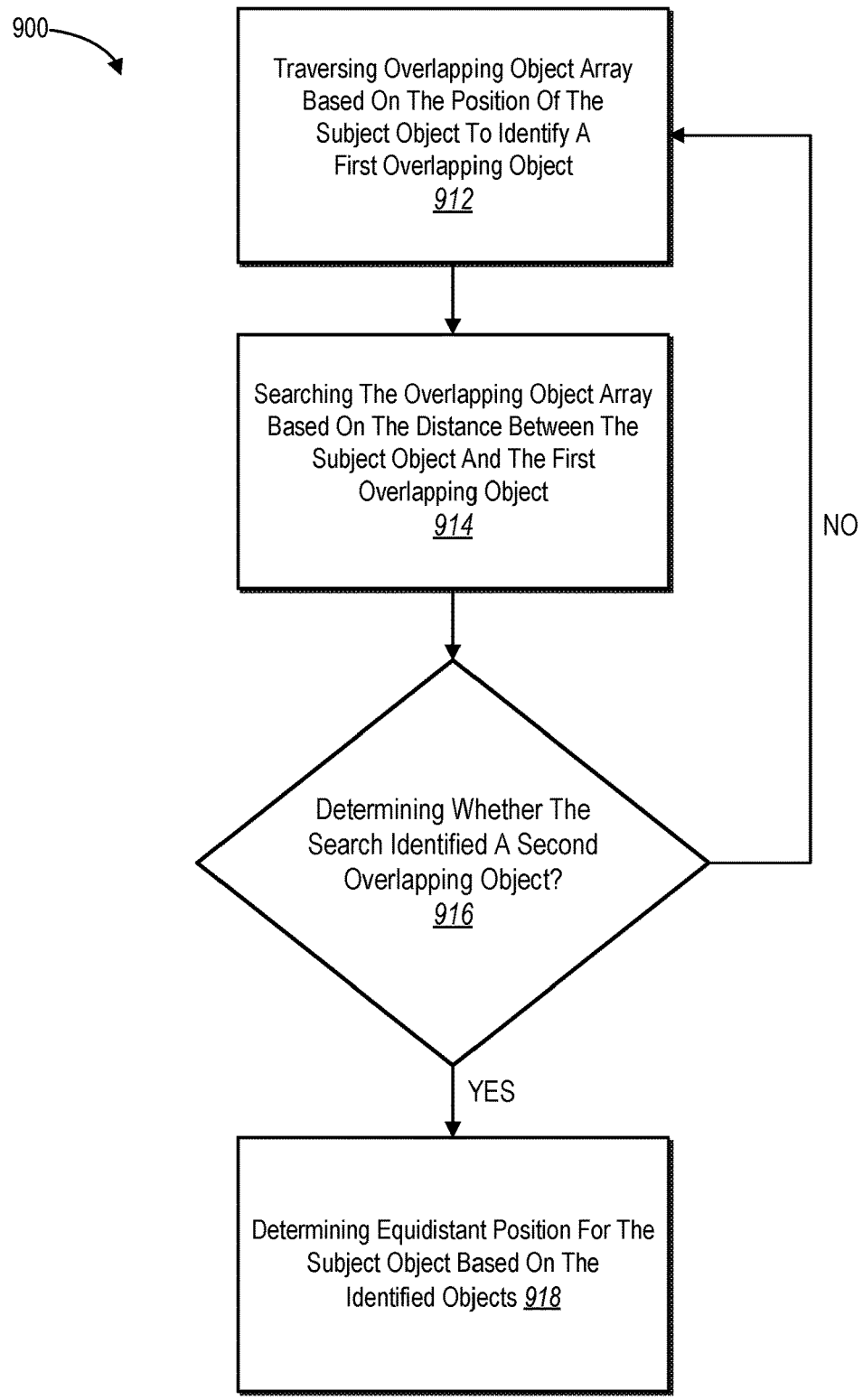

FIGS. 9A-9B illustrate flow diagrams of performing a step for determining an equidistant position for a subject object based on overlapping objects in accordance with one or more embodiments. In particular, FIG. 9A illustrates determining an equidistant position for a subject object based on surrounding overlapping objects. FIG. 9B illustrates determining an equidistant position for a subject object based on overlapping objects located on one side of the subject object.

As illustrated, FIG. 9A includes acts 902-908 in a step 900 for determining an equidistant position based on one or more overlapping object arrays. In particular, in relation to FIG. 9A, the step 900 determines an equidistant position for a subject object based on surrounding overlapping objects.

The step 900 includes an act 902 of traversing overlapping object arrays based on the position of the subject object to identify a first overlapping object. In some embodiments, the act 902 involves traversing two overlapping object arrays to identify the closest (or farthest) overlapping object to the subject object (i.e., the first overlapping object). Specifically, as mentioned above, the two overlapping object arrays can comprise overlapping objects located on opposite sides of the subject object. Thus, for example, a first overlapping objects array can include objects in a first direction from a subject object and a second overlapping objects array can include objects in a second direction from the subject object, opposite the first direction (e.g., left-and-right sides or top-and-bottom sides). Additional detail regarding traversing overlapping object arrays (i.e., overlapping object sets) to identify a first overlapping object is provided above, such as in connection with FIGS. 3A-3D.

The step 900 also includes an act 904 of identifying a second overlapping object corresponding to the first overlapping object. In particular, upon identifying the first overlapping object, the equidistant object relocating system can identify a second corresponding overlapping object. In general, if the equidistant object relocating system identifies the first overlapping object in the first overlapping object array, then the equidistant object relocating system identifies the second overlapping object from the second array, and vice-versa. For example, the equidistant object relocating system can identify the closest overlapping object in the first overlapping objects array and identify the closest overlapping object in the second overlapping objects array.

Similarly, if the first overlapping object is the farthest overlapping object in the first overlapping object array, then the equidistant object relocating system traverses the second overlapping object array to identify the farthest overlapping object in the array as the second corresponding overlapping object. Additional detail regarding identifying a second overlapping object is provided above, such as in connection with FIGS. 3A-3D.

FIG. 9A also shows that the step 900 includes an act 906 of determining whether the identified overlapping objects satisfy a threshold tolerance. As described above, in one or more embodiments, the equidistant object relocating system determines the distances between the first object and second object with respect to the subject object. Further, the equidistant object relocating system can compare the distances to determine whether the distances are within a threshold tolerance of each other. In one or more embodiments, the equidistant object relocating system determines whether a first distance between a first reference object from a first overlapping objects array and the subject object is within a threshold tolerance of a second distance between a second reference object from a second overlapping objects array and the subject object.

As shown, when the first overlapping object and the second overlapping object do not satisfy the threshold tolerance, the step 900 returns to the act 902 of traversing the overlapping object arrays to determine a first overlapping object. In some embodiments, the equidistant object relocating system uses the previously identified overlapping object with the longer (or shorter if traversing from farther to nearest) distance as the new first overlapping object. Further, the equidistant object relocating system determines the next closest overlapping object in the opposite overlapping object array as the second corresponding overlapping object (e.g., the act 904), as described above. In this manner, the equidistant object relocating system can efficiently traverse through the overlapping object arrays, as described above.

When the first overlapping object and the second overlapping object are within a threshold tolerance of each other, the equidistant object relocating system can determine an equidistant position using the identified overlapping objects. As illustrated, the step 900 includes an act 908 of determining the equidistant position for the subject object based on the identified overlapping objects (e.g., the surrounding overlapping objects). Additional description regarding determining an equidistant position based on identified overlapping objects that surround a subject object is provided above, such as in connection with FIGS. 3A-3D.

As mentioned above, FIG. 9B illustrates alternate (or additional) acts 912-918 for performing the step 900 of determining an equidistant position for a subject object based on one or more overlapping objects arrays. Specifically, in relation to the embodiment of FIG. 9B, the step 900 determines an equidistant position for a subject object based on a sequence of reference objects in a single direction from the subject object.

In relation to FIG. 9B, the step 900 includes an act 912 of traversing an overlapping object array based on the position of the subject object to identify a first overlapping object. In some embodiments, the act 912 involves traversing a single overlapping object array reflecting objects in a single direction from the subject object to identify the closest (or farthest) overlapping object to the subject object (i.e., the first overlapping object). Additional detail regarding traversing an overlapping object array (i.e., overlapping object set) to identify a first overlapping object is provided above, such as in connection with FIGS. 4A-4C.

The step 900 also includes an act 914 of searching the overlapping object array based on the distance between the subject object and the first overlapping object. In one or more embodiments, the equidistant object relocating system calculates the distance between a point on the subject object and a point on the first overlapping object to determine a first distance, as described above. As also described above, in some embodiments, the equidistant object relocating system uses the first distance and a threshold tolerance to determine a search position or search range. Then, in various embodiments, the equidistant object relocating system searches the overlapping object array to find any overlapping objects found at the search position or within the search range. Additional detail regarding searching the overlapping object array is provided above, such as in connection with FIGS. 5A-6B.

In addition, the step 900 includes an act 916 of determining whether the search identified a second overlapping object. In particular, the equidistant object relocating system determines whether the search identified a second overlapping object within the overlapping object array located within the search range. In one or more embodiments, the equidistant object relocating system determines whether a first distance between the subject object and a first reference object from a first overlapping objects array is within a threshold tolerance of a second distance between a second reference object from the first overlapping objects array and the first reference object.

If the search identifies a second overlapping object, then the method includes an act 918 of determining the equidistant position for the subject object based on the identified overlapping objects (e.g., the first and second overlapping objects). For example, because the first and the second overlapping objects are located on the same side of the subject object, the equidistant object relocating system determines an equidistant position for the subject object such that the first overlapping object and the subject object are the same distance from each other as the first overlapping object and the second overlapping object. Additional description regarding determining an equidistant position based on identified overlapping objects that surround a subject object is provided above, such as in connection with FIGS. 3A-3D.

Otherwise, if the search does not identify a second overlapping object, the equidistant object relocating system repeats the act 912 of traversing the overlapping object array to identify a new first object. For example, the equidistant object relocating system identifies the next closest (or farthest) overlapping object in the overlapping object array. Then, the equidistant object relocating system repeats the acts 914, 916 to determine an equidistant position from the subject object, based on the subject object's current position.

Figure 10:
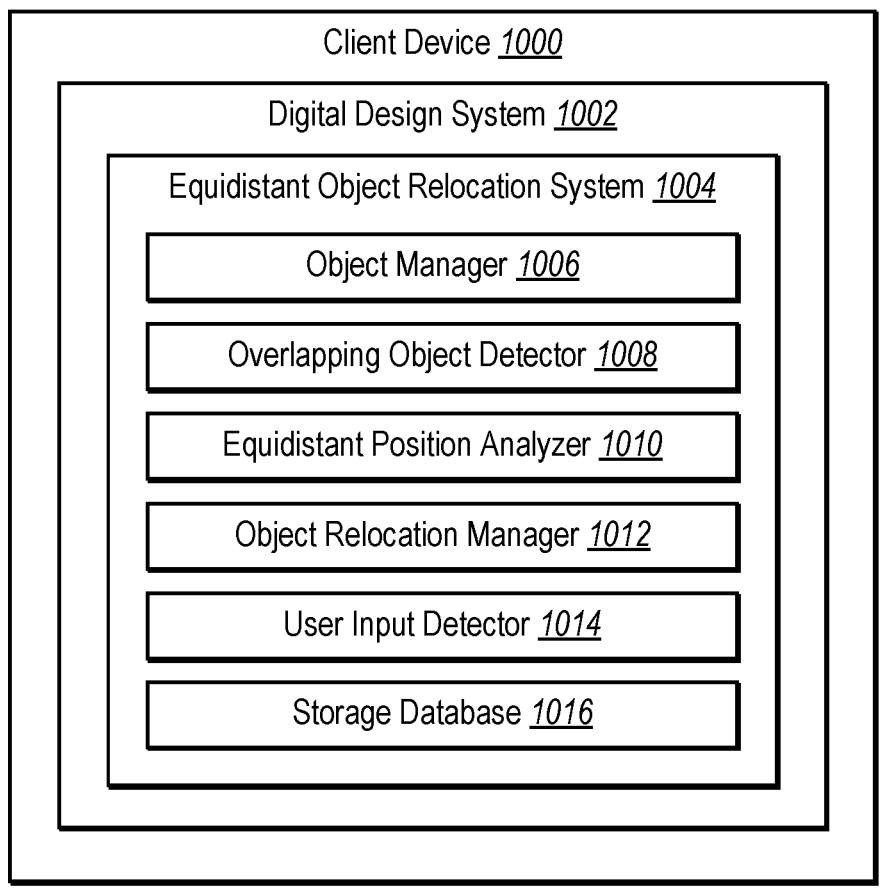
FIG. 10 illustrates a schematic diagram of the equidistant object relocating system in accordance with one or more embodiments.

Referring now to FIG. 10, additional detail will be provided regarding capabilities and components of the equidistant object relocating system in accordance with one or more embodiments. In particular, FIG. 10 shows a schematic diagram of an example equidistant object relocating system 1004 located within a digital design system 1002 and hosted on a client device 1000. The equidistant object relocating system 1004 can represent one or more embodiments of the equidistant object relocating system described previously.

As shown, the equidistant object relocating system 1004 is located on a client device 1000 within a digital design system 1002. In general, the client device 1000 may represent various types of client devices. For example, in some embodiments, the client is a mobile device 1000, such as a mobile telephone, a smartphone, a PDA, a tablet, a laptop, a wearable device, etc. In other embodiments, the client device 1000 is a non-mobile device, such as a desktop or server, or another type of client device. Additional details with regard to the client device 1000 are discussed below with respect to FIG. 14.

The digital design system 1002, in general, facilitates the creation, modification, sharing, and/or deletion of digital images, illustrations, vector drawings, and/or designs (e.g., digital documents). In one or more embodiments, the digital design system 1002 is a design application such as ADOBE® ILLUSTRATOR®. In other embodiments, the digital design system 1002 includes multiple applications, functions, and operations relating to digital designs, such as an application suite, a social networking platform, and/or system operations on the client device 1000. In addition, the digital design system 1002 and the equidistant object relocating system 1004 can include computer-executable instructions that, when executed by the client device 1000 cause the client device 1000 to perform a number of actions, as discussed in more detail below.

As illustrated in FIG. 10, the equidistant object relocating system 1004 includes various components. For example, the equidistant object relocating system 1004 includes an object manager 1006, an overlapping object detector 1008, an equidistant position analyzer 1010, an object relocation manager 1012, a user input detector 1014, and a storage database 1016. Each of these components is described below in turn.

The object manager 1006 can detect, arrange, order, and/or organize objects within a digital document. For example, in one or more embodiments the object manager 1006 creates, builds, generates, and/or creates an object list or cache of objects within a digital document (e.g., a cache of all objects or all reference objects). In some embodiments, the object manager 1006 stores object lists or caches in the storage database 1016. In addition, as objects are added, removed, or modified, the object manager 1006 updates the object list to reflect the changed objects.

In some embodiments, the object manager 1006 generates one or more sorted object lists (i.e., sorted object caches). For example, the object manager 1006 sorts the object list from left-to-right, right-to-left, top-to-bottom, and/or bottom-to-top. As with the object list mentioned above, the object manager 1006 can update the sort order or arrangement of a sorted list when objects in a digital document change position or arrangement. Additional detail regarding generating and updating object lists, included sorted object lists, is provided above, such as in connection with FIG. 2.

In one or more embodiments, a user selects one of the objects within a digital document (e.g., based on detected user input, as described below). The object manager 1006 can assign the selected object as a subject object based on the user input. For example, the object manager 1006 tags or otherwise indicates the selected object as a subject object within the objects list. In addition, based on identifying a subject object, the object manager 1006 can indicate that the remaining objects in the objects list serve as reference objects to the subject object.

In addition to the object manager 1006, as shown in FIG. 10, the equidistant object relocating system 1004 also includes the overlapping object detector 1008. The overlapping object detector 1008 can generate, build, and/or create one or more sets of overlapping objects based on a subject object within a digital document. More specifically, based on a position of the subject object, the overlapping object detector 1008 determines reference objects that overlap with the subject object. For example, the overlapping object detector 1008 identifies if the objects list (e.g., a sorted objects list) includes one or more reference objects that lie within a region projected from one side of the subject object. If so, the overlapping object detector 1008 assigns the identified reference object to an overlapping object set.

In some embodiments, the overlapping object detector 1008 repeats the above process for other sides of the subject object. For example, the overlapping object detector 1008 generates a separate overlapping object array for overlapping objects located on each side (e.g., left, right, top, bottom, or diagonal) of the subject object. Further, each time a subject object changes position within a digital document, the overlapping object detector 1008 can generate new or modified overlapping object sets based on the updated position of the subject object. Additional detail regarding generating overlapping objects and overlapping object sets (e.g., arrays) is provided above, such as in connection with FIG. 2.

As shown in FIG. 10, the equidistant object relocating system 1004 also includes the equidistant position analyzer 1010. The equidistant position analyzer 1010 can determine an equidistant position for a subject object based on at least two overlapping objects in one or more overlapping object sets. In one or more embodiments, the equidistant position analyzer 1010 traverses an overlapping object set to identify a first overlapping object. In addition, and as described above, the equidistant position analyzer 1010 traverses the same or a different overlapping object set to identify a second overlapping object. Based on the two identified overlapping objects, the equidistant position analyzer 1010 can determine whether the identified overlapping objects are suitable to determine an equidistant position for a subject object.

In one or more embodiments, the equidistant position analyzer 1010 determines that the identified overlapping objects satisfy a threshold tolerance and are suitable to determine the equidistant position for the subject object. In other embodiments, the equidistant position analyzer 1010 determines that the identified overlapping objects do not satisfy a threshold tolerance. Therefore, as described above in connection with FIGS. 3A-6B, the equidistant position analyzer 1010 traverses one of the overlapping objects (e.g., based on distance to the subject object) to identify another pair of overlapping objects that satisfy the threshold tolerance, and thus, are suitable to determine the equidistant position for the subject object.

Using a suitable pair of overlapping objects, the equidistant position analyzer 1010 determines an equidistant position for the subject object given the subject object's position. In one or more embodiments, the equidistant position analyzer 1010 determines the equidistant position based on two overlapping objects surrounding the subject object. In some embodiments, the equidistant position analyzer 1010 determines the equidistant position based on two overlapping objects located on one side of the subject object. Additional detail regarding determining an equidistant position based on overlapping objects is described previously, such as in connection with FIGS. 3A-6B.

In various embodiments, the equidistant position analyzer 1010 provides a priority order when determining an equidistant position for a subject object. For example, the equidistant position analyzer 1010 can specify determining equidistant positions based on overlapping objects in one direction from a subject object before determining equidistant positions based on overlapping objects surrounding a subject object. Similarly, the equidistant position analyzer 1010 can specify determining equidistant positions based on a horizontal direction before determining equidistant positions based on vertical directions. In some embodiments, the equidistant position analyzer 1010 prioritizes equidistant position snapping operations based on user input, as described above.

The equidistant object relocating system 1004 also includes the object relocation manager 1012. The object relocation manager 1012, in general, moves a subject object within a digital document. For example, the object relocation manager 1012 can move, relocate, and/or snap a subject object (or a representation of a subject object) from its current position to an equidistant position. For example, as a user moves a subject object within a digital document, the object relocation manager 1012 automatically snaps the subject object (or a subject object representation) to an equidistant position. In one or more embodiments, the object relocation manager 1012 moves the subject object in a single direction (e.g., along the x-axis or y-axis). In some embodiments, the object relocation manager 1012 additionally applies an alignment to the subject object when moving the subject object to an equidistant position, as described above.

In one or more embodiments, the object relocation manager 1012 provides visual guides and/or a subject object representation to a user in connection with relocating a subject object to an equidistant position. For example, the object relocation manager 1012 provides a guideline that indicates which overlapping objects were used to determine the equidistant position. Further, the guidelines can include the distance between the subject object and an overlapping object, and/or between overlapping objects, as provided above with respect to FIG. 7. In addition, the relocation manager 1012 provides a subject object representation that visually indicates the current position and/or equidistant position of a subject object while the user is dragging the subject object.

The user input detector 1014, in general, detects input provided by a user. As an overview, the user input detector 1014 detects, receives, and/or facilitates user input in any suitable manner. In some instances, the user input detector 1014 detects one or more user interactions (e.g., a single interaction, or a combination of interactions) with respect to a user interface. For example, the user input detector 1014 detects a user interaction from a keyboard, mouse, touch page, touch screen, and/or any other input device.

The user input detector 1014 may additionally, or alternatively, receive data representative of a user interaction. For example, the user input detector 1014 may receive one or more user-configurable parameters from a user, one or more commands from the user, and/or any other suitable user input. The user input detector 1014 may receive input data from one or more components of the client device 1000 and/or from one or more remote locations.

The equidistant object relocating system 1004 performs one or more functions in response to the user input detector 1014 detecting user input and/or receiving other data. Generally, a user can control, navigate within, and otherwise use the object relocating system 1004 by providing one or more user inputs that the user input detector 1014 detects. For example, in response to the user input detector 1014 detecting user input selecting and/or moving a subject object within a digital document, the equidistant object relocating system 1004 snaps the subject object to a determined equidistant position.

The storage database 1016 can maintain information relating to digital documents and objects within one or more digital documents. As mentioned above, the storage database 1016 can maintain object lists and/or object caches, including sorted object lists. In addition, the storage database 1016 can temporarily store sets of overlapping objects. Further, the storage database 1016 can maintain information and metadata associated with each object, such as an identifier, position, points (e.g., center, edges, and/or corners), size (e.g., bounds size), rotation, shear, color, transparency, etc., of each object in a digital document. For instance, the storage database 1016 maintains the position of a subject object and each reference objects within a digital document.

Each of the components 1006-1016 of the equidistant object relocating system 1004 can include software, hardware, or both. For example, the components 1006-1016 can include one or more instructions stored on a computer-readable storage medium and executable by processors of one or more computing devices, such as a client device or server device. When executed by the one or more processors, the computer-executable instructions of the equidistant object relocating system 1004 can cause the computing device(s) to perform the feature learning methods described herein. Alternatively, the components 1006-1016 can include hardware, such as a special-purpose processing device to perform a certain function or group of functions. Alternatively, the components 1006-1016 of the equidistant object relocating system 1004 can include a combination of computer-executable instructions and hardware.

Furthermore, the components 1006-1016 of the equidistant object relocating system 1004 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1006-1016 may be implemented as a stand-alone application, such as a desktop or mobile application. Furthermore, the components 1006-1016 may be implemented as one or more web-based applications hosted on a remote server. The components 1006-1016 may also be implemented in a suite of mobile device applications or "apps." To illustrate, the components 1006-1016 may be implemented in an application, including but not limited to ADOBE® ILLUSTRATOR®, ADOBE PHOTOSHOP®, ADOBE® CREATIVE CLOUD® software. "ADOBE," "ILLUSTRATOR," "PHOTOSHOP," and "CREATIVE CLOUD" are either registered trademarks or trademarks of Adobe Systems Incorporated in the United States and/or other countries.

Figure 11:
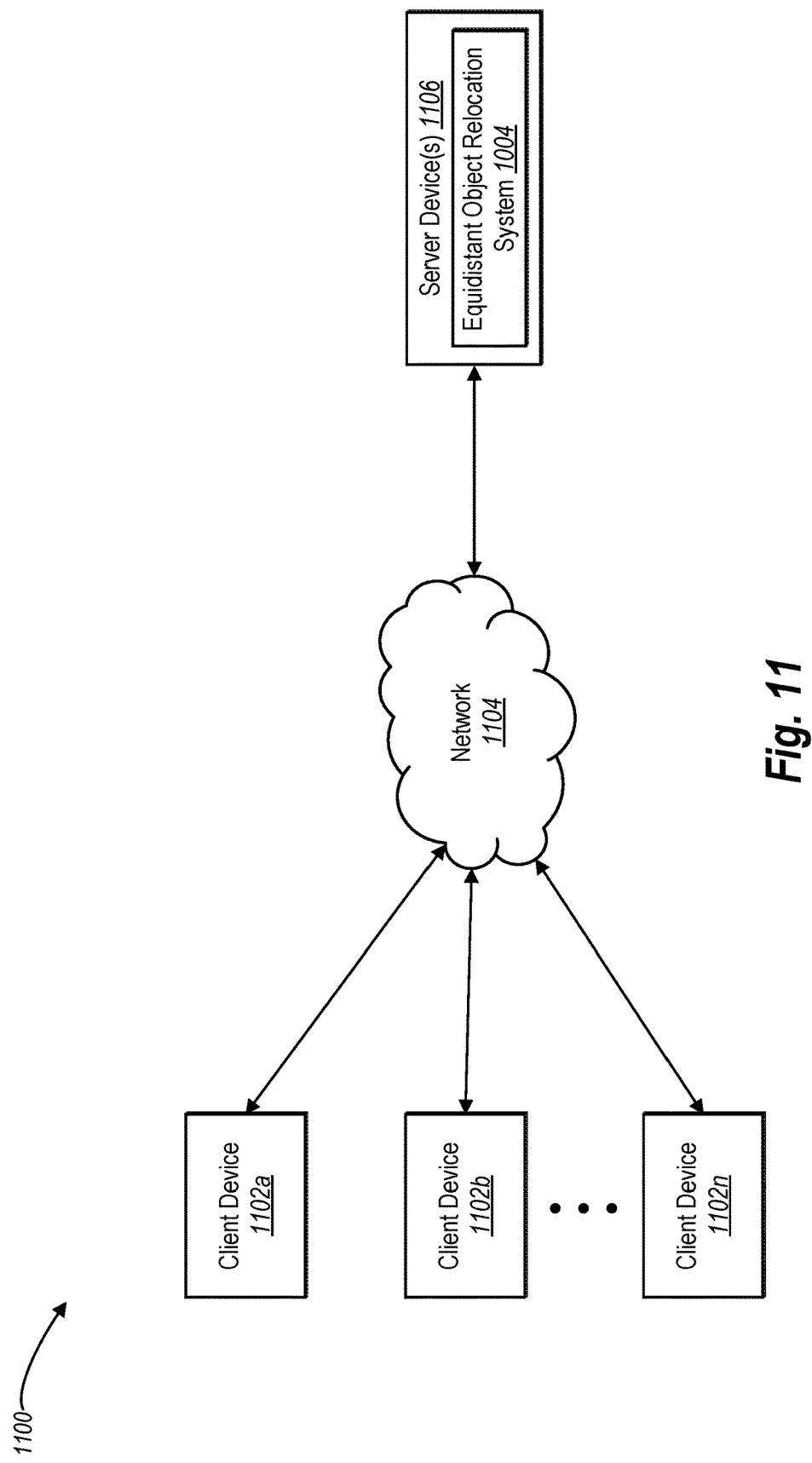
FIG. 11 illustrates a schematic diagram of an exemplary environment in which the equidistant object relocating system may be implemented in accordance with one or more embodiments.

FIG. 11 illustrates a schematic diagram of one embodiment of an exemplary environment 1100 in which the equidistant object relocating system 1004 can operate. In one or more embodiments, the exemplary environment 1100 includes one or more client devices 1102*a*, 1102*b*, . . . 1102*n*, a network 1104, and one or more server device(s) 1106. The network 1104 may be any suitable network over which the computing devices can communicate. Example networks are discussed in more detail below with regard to FIG. 14.

As illustrated in FIG. 11, the environment 1100 may include client devices 1102*a*-1102*n*. The client devices 1102*a*-1102*n* may comprise any computing device. For instance, in one or more embodiments, one or more of the client devices 1102*a*-1102*n* comprise one or more computing devices described below in relation to FIG. 14.

In addition, the environment 1100 may also include the server device(s) 1106. The server device(s) 1106 may generate, store, receive, and transmit any type of data, including digital document and/or object data, as described above. For example, the server device(s) 1106 transmits an object cache for a digital document to a client device, such as the client device 1102*a*. In another example, the server device(s) 1106 stores objects information for objects in a digital document. Then, as a user moves a subject object within a digital document on a client device, the server device(s) 1106 receives a position of subject object and provides the client device with an equidistant position for the subject object.

As illustrated, in one or more embodiments, the server device(s) 1106 can include all, or a portion of, the equidistant object relocating system 1004. In particular, the equidistant object relocating system 1004 can comprise an application running on the server device(s) 1106 or a portion of a software application that can be downloaded from the server device(s) 1106. For example, the equidistant object relocating system 1004 can include a web hosting application that allows the client devices 1102*a*-1102*n* to interact with content hosted at the server device(s) 1106. To illustrate, in one or more embodiments of the exemplary environment 1100, one or more client devices 1102*a*-1102*n* can access a webpage supported by the server device(s) 1106. In particular, the client device 1102*a* can run an application to allow a user to access, view, and/or interact with a webpage or website hosted at the server device(s) 1106 (e.g., a webpage enables a user to edit objects within a digital document).

Although FIG. 11 illustrates a particular arrangement of the client devices 1102*a*-1102*n*, the network 1104, and the server device(s) 1106, various additional arrangements are possible. For example, while FIG. 11 illustrates multiple separate client devices 1102*a*-1102*n* communicating with the server device(s) 1106 via the network 1104, in one or more embodiments a single client device may communicate directly with the server device(s) 1106, bypassing the network 1104.

Similarly, although the environment 1100 of FIG. 11 is depicted as having various components, the environment 1100 may have additional or alternative components. For example, the equidistant object relocating system 1004 can be implemented on a single computing device. In particular, the equidistant object relocating system 1004 may be implemented in whole by the client device 1102*a* or the equidistant object relocating system 1004 may be implemented in whole by the server device(s) 1106. Alternatively, the equidistant object relocating system 1004 may be implemented across multiple devices or components (e.g., utilizing the client devices 1102*a*-1102*n* and the server device(s) 1106).

By way of example, in one or more embodiments, the client device 1102*a* sends a request to the server device(s) 1106 to edit a digital document. The server device(s) 1106 can provide for display the digital document to the client device 1102*a*. The client device 1102*a* can receive user input adding, removing, and modifying objects in the digital document. In particular, the user provides input to drag or reposition a subject object within the digital document that includes other reference objects. In response, the client device 1102*a* provides the position of the subject object to the server device(s) 1106, which determines and provides an equidistant position for the subject object to the client device 1102*a*. The client device 1102*a* then snaps the subject object to the equidistant position within the display of the digital document.

FIGS. 1-11, the corresponding text, and the examples provide a number of different systems, methods, techniques, components, and/or devices of the equidistant object relocating system in accordance with one or more embodiments. In addition to the above description, one or more embodiments can also be described in terms of flowcharts including acts in a method for accomplishing a particular result. For example, FIGS. 12 and 13 illustrate flowcharts of exemplary methods in accordance with one or more embodiments described herein.

Figure 12:
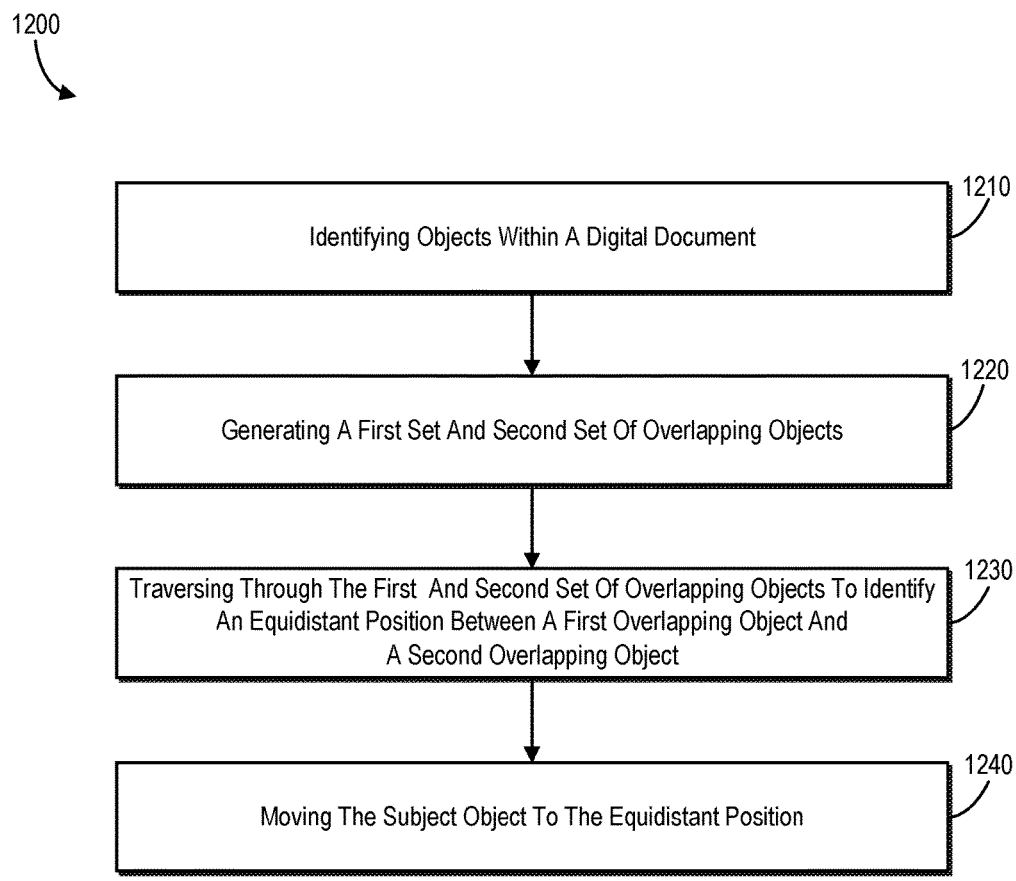
FIG. 12 illustrates a flowchart of a series of acts in a method for automatically and efficiently snapping art objects to an equidistant position between other art objects.
Figure 13:
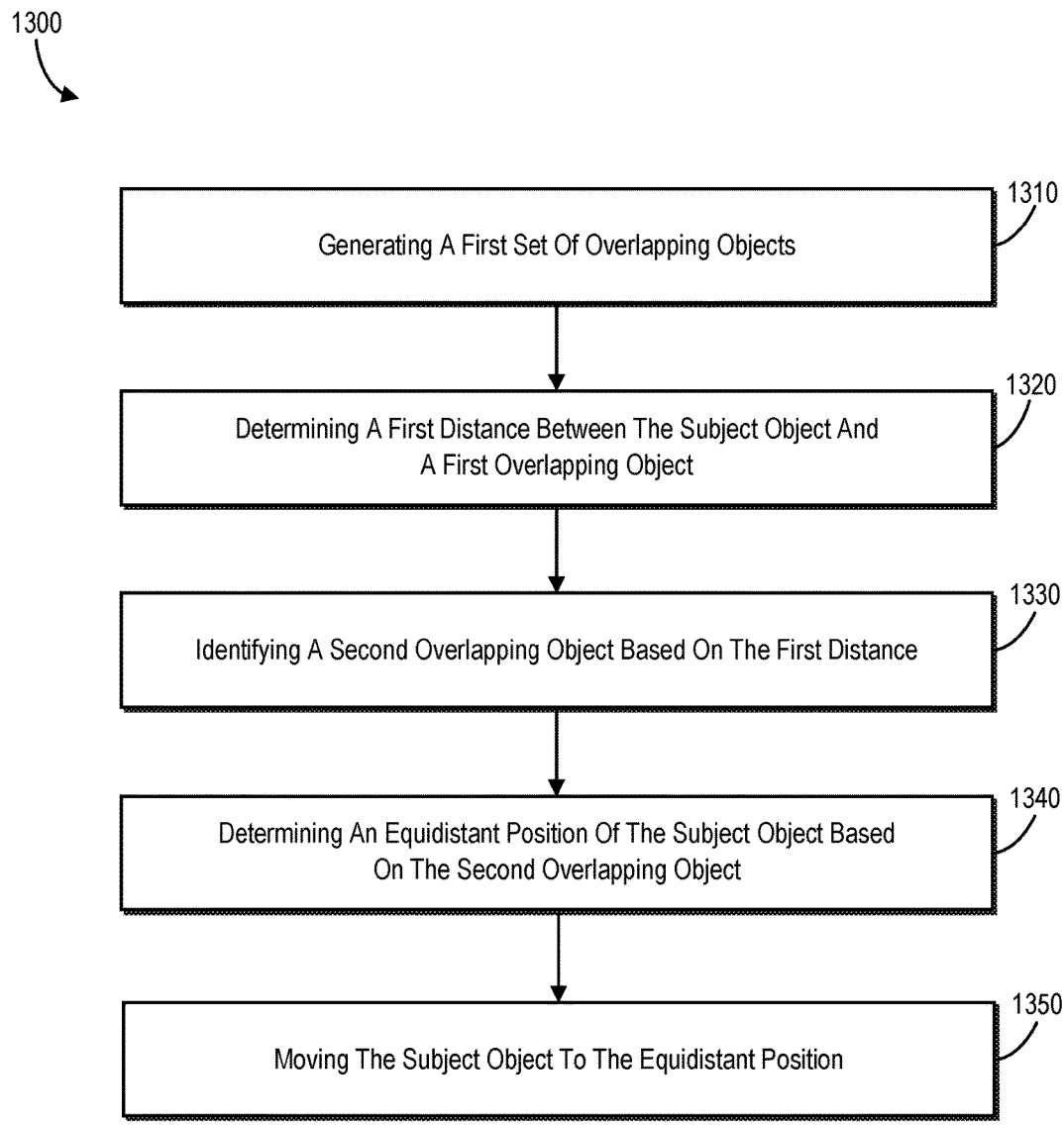
FIG. 13 illustrates a flowchart of a series of acts in a method for automatically snapping an art object to an equidistant position at the end of a sequence of other equidistant art objects in accordance with one or more embodiments.

FIG. 12 illustrates an example flow diagram of a method 1200 for automatically and efficiently snapping art objects to an equidistant location between other art objects. In one or more embodiments, the method 1200 is implemented on a computing device, such as the client device 700, 1000. Further, in some embodiments, the method 1200 is implemented in a digital environment for creating and manipulating digital illustrations.

The method 1200 includes an act 1210 of identifying objects within a digital document. In particular, the act 1210 can involve identifying objects within a digital document 200, where the objects include a subject object 102, 202, 302, 502 in a first position and reference objects 206. In some embodiments, the act 1210 includes arranging the objects within the digital document in a first cache based on the position of each object from a first edge of the digital document to an opposite second edge and arranging the objects within the digital document in a second cache based on the position of each object from the opposite second edge of the digital document to the first edge.

The method 1200 also includes an act 1220 of generating a first set and second set of overlapping objects. In particular, the act 1220 can involve generating a first set of overlapping objects 204*a-d*, 304 from the reference objects by determining reference objects 206 that overlap a first region projected 208 from the subject object 202, 302 in a first direction and generating a second set of overlapping objects 306 from the reference objects by determining reference objects that overlap a second region projected from the subject object 202, 302 in a second direction, opposite the first direction. In one or more embodiments, the act 1220 includes generating the first set of overlapping objects based on the first cache and generating the second set of overlapping objects based on the second cache.

In some embodiments, the act 1220 includes arranging the first set of overlapping objects in an array based on distance from the subject object. In one or more embodiments, the act 1220 includes traversing each of the first set of overlapping objects and the second set of overlapping objects beginning with an overlapping object closest to the subject object and progressing toward an overlapping object farthest from the subject object to identify the first overlapping object from the first set of overlapping objects and the second overlapping object from the second set of overlapping objects.

As shown in FIG. 12, the method 1200 further includes an act 1230 of traversing through the first and second set of overlapping objects to identify an equidistant position between a first overlapping object and a second overlapping object. In particular, the act 1230 can involve traversing through the first set of overlapping objects 304 and the second set of overlapping objects 306 based on the distance from the subject object d1 (FIG. 1A) to identify an equidistant position 308 between a first overlapping object 304*b* from the first set of overlapping objects 304 and a second overlapping object 306*b* from the second set of overlapping objects 306 that satisfies a threshold tolerance 410 corresponding to the first position.

The method 1200 also includes an act 1240 of moving the subject object to the equidistant position. In particular, the act 1240 can involve moving the subject object 102, 302, 708 within the digital document 706, from the first position 716 to the equidistant position 104, 308, 720. In some embodiments, the act 1240 includes aligning the subject object with the first overlapping object 304*b* and/or the second overlapping object 306*b*.

The method 1200 can also include a number of additional acts. In one or more embodiments, the method 1200 includes the acts of detecting movement of the subject object within the digital document to different positions based on user input and dynamically snapping the subject object to equidistant positions from the different positions. In some embodiments, the first position of the subject object includes a center point of the subject object, each of the reference objects includes a center point, and traversing through the first set of overlapping objects and the second set of overlapping objects based on distance from the subject object to identify the equidistant position is further based on the center point of the first overlapping object and the center point of the second overlapping object.

In one or more embodiments, the subject object in the first position includes a first edge point and a second edge point, the first edge point being opposite from the second edge point on the subject object, each of the reference objects include a first edge point and a second edge point where the first edge point is opposite from the second edge point. In addition, in these embodiments traversing through the first set of overlapping objects and the second set of overlapping objects based on distance from the subject object to identify the equidistant position can include identifying a first distance between the first edge point of the subject object and a second edge point of the first overlapping object from the first set of overlapping objects, the first overlapping object being located in the first direction of the subject object, and identifying a second distance between the second edge point of the subject object and a first edge point of the second overlapping object from the second set of overlapping objects where the second overlapping object is located in the second direction the subject object. In some embodiments, the equidistant position is the same distance between the second edge point of the first overlapping object and the first edge point of the second overlapping object.

In addition, the method 1200 can include the act of identifying a third overlapping object from the first set of overlapping objects, where the third overlapping objects is closest in distance to the subject object; dismissing, based on determining that a first distance from the subject object to the third overlapping object is not within the threshold tolerance of a second distance from the subject object to a fourth overlapping object; and dismissing the third overlapping object based on the determination the first distance is not within the threshold tolerance of the second distance. In one or more embodiments, the method 1200 can include the act of determining that the first distance is smaller than the second distance and dismissing the third overlapping object based on the determination.

FIG. 13 illustrates an example flow diagram of a method 1300 for automatically snapping an art object to an equidistant location at the end of a sequence of other equidistant art objects. In one or more embodiments, the method 1300 is implemented on a computing device, such as a client device 700, 1000. Further, in some embodiments, the method 1100 is implemented in a digital environment for creating and manipulating digital illustrations. For example, the method 1300 is implemented on a client device 700, 1000 that stores objects within a digital document 200, 706 and a position for each object, where the objects include a subject object 202, 708 and reference objects 206, 710 and where the subject object has a first position 716.

As shown, the method 1300 includes an act 1310 of generating a first set of overlapping objects. In particular, the act 1310 can include generating a first set of overlapping objects 204*a-d*, 504 by determining reference objects 206 that overlap a region projected 208 from the subject object 202, 502 in a first direction. In one or more embodiments, the act 1310 includes generating the first set of overlapping objects by arranging the first set of overlapping objects based on distance from the subject object. In some embodiments, a reference object 206 overlaps the region projected 208 from the subject object 202, 502 in a first direction when a point on the reference object 206 shares a linear plane with a point on the subject object 202, where the linear plane is parallel to the first direction.

The method 1300 also includes an act 1320 of determining a first distance between the subject object and a first overlapping object. In particular, the act 1320 can involve determining a first distance d3 (FIG. 5C), d1 (FIG. 6A) in the first direction between the subject object 502, 602 and a first overlapping object 504*b*, 604*a* in the first set of overlapping objects 504, 604. In some embodiments, the act 1320 includes determining the first distance d1 (FIG. 6A) based on the absolute value between a point on the first overlapping object 504*b*, 604*a* and a point on the subject object 502, 602.

In addition, the method 1300 includes an act 1330 of identifying a second overlapping object based on the first distance. In particular, the act 1330 can involve identifying a second overlapping object 504*d*, 604*b-d* in the first set of overlapping objects 504, 604 by searching a subset of overlapping objects 604*b-d* from the first set of overlapping objects 504, 604, where the subset of overlapping objects 604*b-d* is based on the first distance d1 (FIG. 6A) between the subject object 602 and the first overlapping object 604*a*, the position of the first overlapping object 604*a*, and a threshold tolerance 608. In some embodiments, the act 1330 includes identifying the subset of overlapping objects 604*b-d* in the first set of overlapping objects 604 by identifying one or more overlapping objects 604*b-d* within the first set of overlapping objects 604 that are within the threshold tolerance 608 of the first distance d1 (FIG. 6A) from the first overlapping object 604*a*.

Further, the method 1300 includes an act 1340 of determining an equidistant position of the subject object based on the second overlapping object. In particular, the act 1340 can involve determining an equidistant position 510, 610 of the subject object 502, 602, based on a second distance d3 (FIG. 5C), d2 (FIG. 6B) between the first overlapping object 504*b*, 604*a*, and the second overlapping object 504*d*, 604*b*. In one or more embodiments, the act 1340 includes traversing through the first set of overlapping objects 504, 604 by starting at an overlapping object that is closest to the subject object and progressing toward an overlapping object that is farthest from the subject object (or vice-versa) until the equidistant position 510, 610 is determined.

The method 1300 also includes an act 1350 of moving the subject object to the equidistant position. In particular, the act 1340 can involve moving the subject object 502, 602, 708 within the digital document 200, 706 from the first position 716 to the equidistant position 510, 610, 720. In one or more embodiments, moving the subject object 502, 602, 708 within the digital document 200, 706 from the first position 716 to the equidistant position 510, 610, 720 includes snapping the subject object 502, 602, 708 to the equidistant position 510, 610, 720. In some embodiments, the act 1340 includes aligning the subject object with the first overlapping object and/or the second overlapping object.

The method 1300 can also include a number of additional acts. In one or more embodiments, the method 1300 involves the acts of determining a third distance between a closest overlapping object in the first set of overlapping objects and the subject object, determining that no overlapping objects in the first set of overlapping objects are positioned within the threshold tolerance of the third distance from the position of the closest overlapping object, and identifying a next closest overlapping object in the first set of overlapping objects as the first overlapping object.

In some embodiments, the method 1300 also includes the act of searching the subset of overlapping objects in the first set of overlapping objects for the second overlapping object by traversing through each of the one or more identified overlapping objects within the subset of overlapping objects to identify an overlapping object within the subset of overlapping objects that is positioned closest to the first distance from the first overlapping object.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the equidistant object relocating system to relocate a subject object to an equidistant position based on other objects within a digital document, as described herein.

Embodiments of the present disclosure may include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 14:
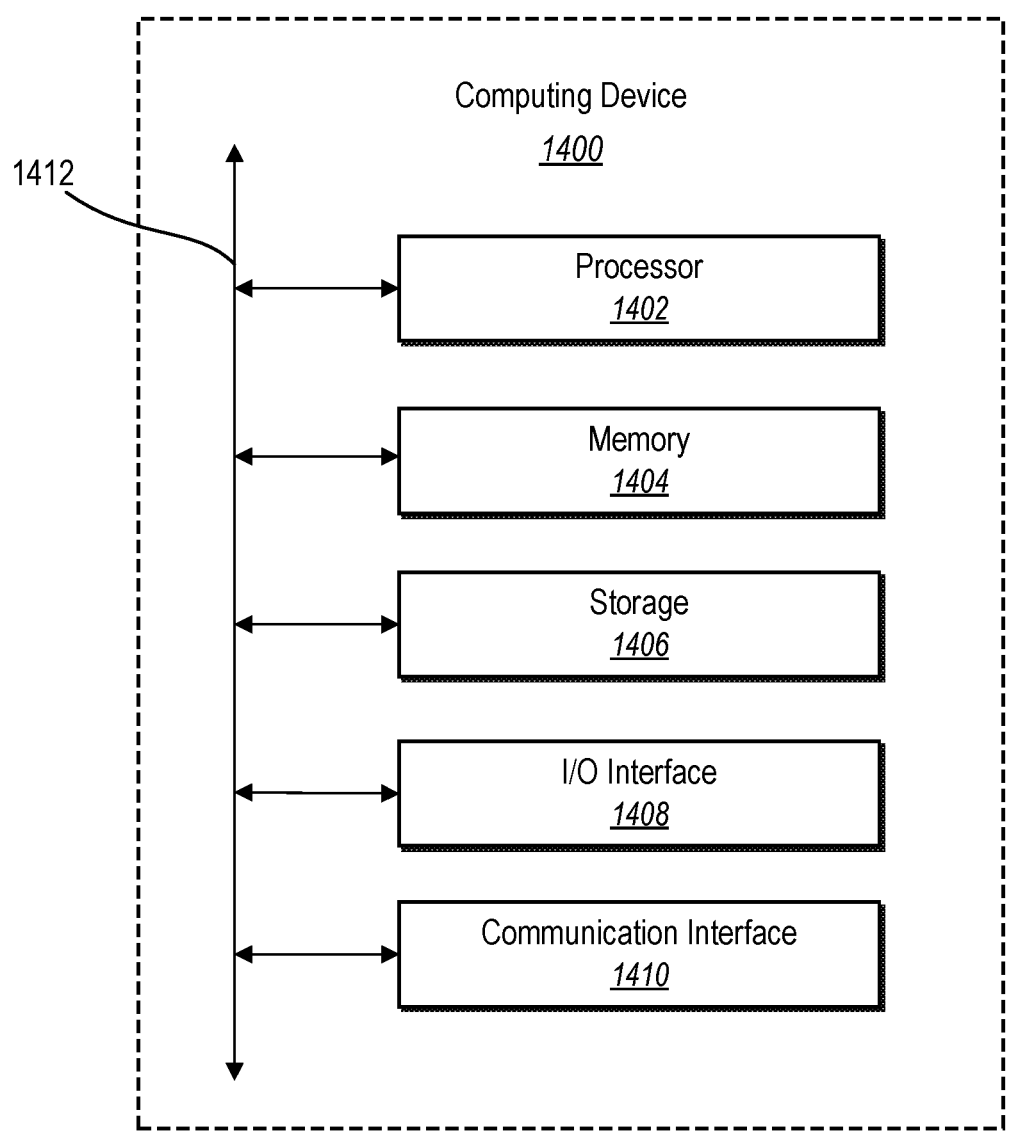
FIG. 14 illustrates a block diagram of an exemplary computing device for implementing one or more embodiments of the present disclosure.

FIG. 14 illustrates a block diagram of an exemplary computing device 1400 that may be configured to perform one or more of the processes described above. One will appreciate that one or more computing devices, such as the computing device 1400 may represent the client devices 700, 1000 described above. In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output ("I/O") interfaces 1408, and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for creating and manipulating digital illustrations, a computer-implemented method of automatically and efficiently snapping art objects to an equidistant location between other art objects, the method comprising:
   identifying objects within a digital document, the objects comprising a subject object and a plurality of reference objects;
   in response to detecting a movement of the subject object to a first position within the digital document:
      generating a first set of overlapping objects from the reference objects by determining reference objects that overlap a first region projected from the subject object in a first direction;
      generating a second set of overlapping objects from the reference objects by determining reference objects that overlap a second region projected from the subject object in a second direction, opposite the first direction;
      traversing through the first set of overlapping objects and the second set of overlapping objects based on distance from the subject object to identify an equidistant position between a first overlapping object from the first set of overlapping objects and a second overlapping object from the second set of overlapping objects that satisfies a threshold tolerance corresponding to the first position; and
   moving the subject object within the digital document from the first position to the equidistant position.

2. The method of claim 1, wherein generating the first set of overlapping objects comprises arranging the first set of overlapping objects in an array based on distance from the subject object.

3. The method of claim 1, further comprising: detecting movement of the subject object within the digital document to a plurality of different positions based on user input; and dynamically snapping the subject object to a plurality of equidistant positions from the plurality of different positions.

4. The method of claim 1, wherein traversing through the first set of overlapping objects and the second set of overlapping objects based on distance from the subject object comprises traversing each of the first set of overlapping objects and the second set of overlapping objects beginning with an overlapping object closest to the subject object and progressing toward an overlapping object farthest from the subject object to identify the first overlapping object from the first set of overlapping objects and the second overlapping object from the second set of overlapping objects.

5. The method of claim 1, wherein:
   the first position of the subject object comprises a center point of the subject object;
   each of the reference objects comprise a center point; and
   traversing through the first set of overlapping objects and the second set of overlapping objects based on distance from the subject object to identify the equidistant position is further based on the center point of the first overlapping object and the center point of the second overlapping object.

6. The method of claim 1, wherein:
the subject object in the first position comprises a first edge point and a second edge point, the first edge point being opposite from the second edge point on the subject object;
each of the reference objects comprise a first edge point and a second edge point, the first edge point being opposite from the second edge point; and
traversing through the first set of overlapping objects and the second set of overlapping objects based on distance from the subject object to identify the equidistant position comprises:
identifying a first distance between the first edge point of the subject object and a second edge point of the first overlapping object from the first set of overlapping objects, the first overlapping object being located in the first direction of the subject object; and
identifying a second distance between the second edge point of the subject object and a first edge point of the second overlapping object from the second set of overlapping objects, wherein the second overlapping object is located in the second direction the subject object.

7. The method of claim 6, wherein the equidistant position is the same distance between the second edge point of the first overlapping object and the first edge point of the second overlapping object.

8. The method of claim 1, wherein traversing through the first set of overlapping objects and the second set of overlapping objects based on the distance from the subject object to identify the equidistant position further comprises:
identifying a third overlapping object from the first set of overlapping objects, wherein the third overlapping objects is closest in distance to the subject object;
determining that a first distance from the subject object to the third overlapping object is not within the threshold tolerance of a second distance from the subject object to a fourth overlapping object; and
dismissing the third overlapping object based on the determination the first distance is not within the threshold tolerance of the second distance.

9. The method of claim 1, further comprising:
arranging the objects within the digital document in a first cache based on a position of each object from a first edge of the digital document to an opposite second edge;
arranging the objects within the digital document in a second cache based on the position of each object from the opposite second edge of the digital document to the first edge;
generating the first set of overlapping objects based on the first cache; and
generating the second set of overlapping objects based on the second cache.

10. A system for automatically snapping an art object to an equidistant location at an end of a sequence of other equidistant art objects, the system comprising:
a memory that includes objects within a digital document and a position for each object, wherein the objects comprise a subject object and a plurality of reference objects;
at least one computing device communicatively coupled to the memory and storing instructions that, when executed by the at least one computing device, cause the system to, in response to detecting a movement of the subject object to a first position within the digital document:
generate a first set of overlapping objects by determining reference objects that overlap a region projected from the subject object in a first direction;
determine a first distance in the first direction between the subject object and a first overlapping object in the first set of overlapping objects;
identify a second overlapping object in the first set of overlapping objects by searching a subset of overlapping objects from the first set of overlapping objects, wherein the subset of overlapping objects is based on the first distance between the subject object and the first overlapping object, the position of the first overlapping object, and a threshold tolerance;
determine an equidistant position of the subject object based on a second distance between the first overlapping object and the second overlapping object; and
move the subject object within the digital document from the first position to the equidistant position.

11. The system of claim 10, further comprising instructions that, when executed by the at least one computing device, cause the system to:
generate the first set of overlapping objects by arranging the first set of overlapping objects based on distance from the subject object; and
traverse through the first set of overlapping objects by starting at an overlapping object that is closest to the subject object and progressing toward an overlapping object that is farthest from the subject object until the equidistant position is determined.

12. The system of claim 11, further comprising instructions that, when executed by the at least one computing device, cause the system to:
determine a third distance between a closest overlapping object in the first set of overlapping objects and the subject object;
determine that no overlapping objects in the first set of overlapping objects are positioned within the threshold tolerance of the third distance from the position of the closest overlapping object; and
identify a next closest overlapping object in the first set of overlapping objects as the first overlapping object.

13. The system of claim 10, further comprising instructions that, when executed by the at least one computing device, cause the system to identify the subset of overlapping objects in the first set of overlapping objects by identifying one or more overlapping objects within the first set of overlapping objects that are within the threshold tolerance of the first distance from the first overlapping object.

14. The system of claim 13, wherein the instructions that, when executed by the at least one computing device, cause the system to search the subset of overlapping objects in the first set of overlapping objects for the second overlapping object by traversing through each of the one or more identified overlapping objects within the subset of overlapping objects to identify an overlapping object within the subset of overlapping objects that is positioned closest to the first distance from the first overlapping object.

15. The system of claim 10, wherein a reference object overlaps the region projected from the subject object in a first direction when a point on the reference object shares a linear plane with a point on the subject object, wherein the linear plane is parallel to the first direction.

16. In a digital medium environment for creating and manipulating digital illustrations, a computer-implemented method of automatically and efficiently snapping art objects to an equidistant location relative to other art objects, the method comprising:

identifying objects within a digital document, the objects comprising a subject object and a plurality of reference objects, each of the reference objects having a position;

in response to detecting a movement of the subject object to a first position within the digital document:

performing a step for generating one or more overlapping objects arrays from the reference objects based on the subject object;

performing a step for determining an equidistant position for the subject object based on the one or more generated overlapping objects arrays; and moving the subject object within the digital document from the first position to the equidistant position.

17. The method of claim 16, wherein performing the step for generating one or more overlapping objects arrays based on the position of each of the reference objects relative to the subject object comprises:

generating a first overlapping objects array from the reference objects by determining reference objects that overlap a first region projected from the subject object in a first direction; and generating a second overlapping objects array from the reference objects by determining reference objects that overlap a second region projected from the subject object in a second direction, opposite the first direction.

18. The method of claim 16, wherein performing the step for generating one or more overlapping objects arrays based on the position of each of the reference objects relative to the subject object comprises:

identifying reference objects positioned in a first direction from the subject object, wherein a point on the reference objects shares a linear plane with a point on the subject object, and wherein the linear plane is parallel to the first direction; and pushing, based on distance from the subject object, the identified reference objects to a first overlapping objects array.

19. The method of claim 16, wherein performing the step for determining the equidistant position for the subject object based on the one or more generated overlapping objects arrays comprises:

determining that a first distance between a first reference object from a first overlapping objects array of the one or more overlapping objects arrays and the subject object is within a threshold tolerance of a second distance between a second reference object from a second overlapping objects array of the one or more overlapping objects arrays and the subject object; and determining the equidistant position based on the first reference object and the second reference object.

20. The method of claim 16, wherein performing the step for determining the equidistant position for the subject object based on the one or more generated overlapping objects arrays comprises:

determining that a first distance between the subject object and a first reference object from a first overlapping objects array of the one or more overlapping objects is within a threshold tolerance of a second distance between a second reference object from the first overlapping objects array and the first reference object; and identifying, based on the determination that the first distance is within the threshold tolerance of the second distance, the equidistant position for the subject object utilizing the second distance between the second reference object and the first reference object.

* * * * *